(12) United States Patent
Quan et al.

(10) Patent No.: US 9,357,561 B2
(45) Date of Patent: May 31, 2016

(54) INFORMATION FEEDBACK METHOD AND APPARATUS

(75) Inventors: Wei Quan, Beijing (CN); Qiao Zhang, Shenzhen (CN); Guanglin Han, Beijing (CN); Yi Jiang, Beijing (CN); Jian Zhang, Beijing (CN); Zhongbin Qin, Warsaw (PL)

(73) Assignee: Huawei Technologies Co., Ltd., Shenzhen (CN)

( * ) Notice: Subject to any disclaimer, the term of this patent is extended or adjusted under 35 U.S.C. 154(b) by 403 days.

(21) Appl. No.: 13/538,659

(22) Filed: Jun. 29, 2012

(65) Prior Publication Data
US 2012/0269156 A1    Oct. 25, 2012

Related U.S. Application Data

(63) Continuation of application No. PCT/CN2010/080555, filed on Dec. 31, 2010.

(30) Foreign Application Priority Data

Dec. 31, 2009  (CN) .......................... 2009 1 0238879
Dec. 31, 2009  (CN) .......................... 2009 1 0238884
Dec. 31, 2009  (CN) .......................... 2009 1 0238885

(51) Int. Cl.
*H04W 4/00* (2009.01)
*H04W 74/00* (2009.01)
(Continued)

(52) U.S. Cl.
CPC ........ *H04W 74/006* (2013.01); *H04W 52/0216* (2013.01); *H04W 52/0219* (2013.01); *H04W 74/0833* (2013.01); *H04W 72/00* (2013.01); *Y02B 60/50* (2013.01)

(58) Field of Classification Search
CPC ...... H04W 72/04; H04W 88/08; H04W 76/00
USPC ................................... 370/329, 322, 328, 338
See application file for complete search history.

(56) References Cited

U.S. PATENT DOCUMENTS

2003/0210668 A1*  11/2003  Malladi ................. H04L 1/0015
                                                                 370/335
2007/0115878 A1    5/2007  Ashish et al.
(Continued)

FOREIGN PATENT DOCUMENTS

CN              1996806 A      7/2007
CN            101005695 A      7/2007
(Continued)

OTHER PUBLICATIONS

U.S. Appl. No. 61/166,407, filed Apr. 2009, Wager; Stefan.*
(Continued)

*Primary Examiner* — Hassan Phillips
*Assistant Examiner* — Siren Wei
(74) *Attorney, Agent, or Firm* — Leydig, Voit & Mayer, Ltd.

(57) ABSTRACT

A CB resource feedback method is disclosed. The method includes: receiving, by a network device, uplink information that is sent by a sending device on a CB resource; when the uplink information is decoded, feeding back, by the network device correct reception of the uplink information to the sending device through a first physical downlink control channel, where the first physical downlink control channel is masked with an identifier of the sending device. Through the technical solutions provided in embodiments of the present invention, the sending device may be enabled to accurately know that the uplink information sent by the sending device is received correctly or is received incorrectly, and the sending device may be enabled to know a receiving status more quickly.

19 Claims, 12 Drawing Sheets

(51) Int. Cl.
  *H04W 52/02* (2009.01)
  *H04W 74/08* (2009.01)
  *H04W 72/00* (2009.01)

(56) References Cited

U.S. PATENT DOCUMENTS

| | | | |
|---|---|---|---|
| 2007/0217370 A1* | 9/2007 | Soong | H04B 7/2621 370/337 |
| 2008/0049813 A1 | 2/2008 | Kurose et al. | |
| 2008/0084844 A1 | 4/2008 | Reznik et al. | |
| 2008/0085680 A1 | 4/2008 | Kim et al. | |
| 2008/0159334 A1 | 7/2008 | Venkatachalam et al. | |
| 2008/0273610 A1 | 11/2008 | Malladi et al. | |
| 2009/0073911 A1 | 3/2009 | Cheon et al. | |
| 2009/0080380 A1* | 3/2009 | Chun | H04W 28/06 370/329 |
| 2009/0088148 A1* | 4/2009 | Chung | H04L 1/0029 455/423 |
| 2009/0092086 A1 | 4/2009 | Lee et al. | |
| 2009/0116434 A1 | 5/2009 | Lohr et al. | |
| 2009/0190572 A1 | 7/2009 | Chang | |
| 2009/0196240 A1* | 8/2009 | Frederiksen | H04L 1/1607 370/329 |
| 2009/0207799 A1 | 8/2009 | Mazzarese | |
| 2009/0259910 A1 | 10/2009 | Lee et al. | |
| 2009/0311967 A1 | 12/2009 | Takase et al. | |
| 2010/0067412 A1 | 3/2010 | Kitazoe et al. | |
| 2010/0103867 A1 | 4/2010 | Kishiyama et al. | |
| 2010/0111028 A1 | 5/2010 | Kim et al. | |
| 2010/0232385 A1 | 9/2010 | Hsu | |
| 2011/0026625 A1 | 2/2011 | Susitaival et al. | |
| 2011/0039568 A1 | 2/2011 | Zhang et al. | |
| 2011/0292895 A1* | 12/2011 | Wager | H04L 5/0007 370/329 |

FOREIGN PATENT DOCUMENTS

| | | | |
|---|---|---|---|
| CN | 101355788 A | 1/2009 | |
| CN | 101364925 A | 2/2009 | |
| CN | 101411240 A | 4/2009 | |
| CN | 101426271 A | 5/2009 | |
| CN | 101523966 A | 9/2009 | |
| CN | 101569115 A | 10/2009 | |
| EP | 1816883 A1 | 8/2007 | |
| EP | 2015478 A2 | 1/2009 | |
| EP | 2112845 A1 | 10/2009 | |
| EP | 2136584 A2 | 12/2009 | |
| JP | 2009525644 A | 7/2009 | |
| JP | 2009303052 A | 12/2009 | |
| JP | 2010530171 A | 9/2010 | |
| JP | 2011520378 A | 7/2011 | |
| WO | WO 2007078177 A1 | 7/2007 | |
| WO | WO 2007087842 A1 | 8/2007 | |
| WO | WO 2007091676 A1 | 8/2007 | |
| WO | WO 2008024788 A2 | 2/2008 | |
| WO | WO 2008153365 A2 | 12/2008 | |
| WO | WO 2008157799 A2 | 12/2008 | |
| WO | WO 2009057932 A2 * | 5/2009 | H04W 74/08 |
| WO | WO 2009136830 A1 | 11/2009 | |
| WO | WO 2009156826 A1 | 12/2009 | |
| WO | WO 2010057540 A1 | 5/2010 | |

OTHER PUBLICATIONS

U.S. Appl. No. 61/166,407 Provisional Specification.*
"R2-093812—Contention Based Uplink Transmissions," 3GPP TSG-RAN WG2 #66bis, Jun. 29-Jul. 3, 2009, 3GPP, Valbonne, France.
Shang, Yanlei, "Study of MAC and Resource Management in Wireless Broadband Networks," Doctoral Dissertation, Apr. 2006, Beijing University of Post and Telecommunications, Bejing, China.
International Search Report in corresponding International Patent Application No. PCT/CN2010/080555 (Mar. 31, 2011).
Written Opinion of the International Searching Authority in corresponding International Patent Application No. PCT/CN2010/080555 (Mar. 31, 2011).
Extended European Search Report in corresponding European Patent Application No. 10840600.0 (Jan. 16, 2013).
"R2-093447—Various Correction to MAC," 3GPP TSG-RAN WG2 Meeting #66, May 5-8, 2009, 36.321 CR 0351, rev 1, V8.5.0, 3GPP, Valbonne, France.
"3GPP TS 36.213—3$^{rd}$ Generation Partnership Project; Technical Specification Group Radio Access Network; Evolved Universal Terrestrial Radio Access (E-UTRA); Physical layer procedures (Release 9)," Dec. 2009, Version 9.0.1, 3$^{rd}$ Generation Partnership Project, Valbonne, France.
"3GPP TS 36.321—3$^{rd}$ Generation Partnership Project; Technical Specification Group Radio Access Network; Evolved Universal Terrestrial Radio Access (E-UTRA) Medium Access Control (MAC) protocol specification (Release 8)," Dec. 2009, Version 8.8.0, 3$^{rd}$ Generation Partnership Project, Valbonne, France.
Final Office Action in corresponding U.S. Appl. No. 13/539,166 (Nov. 4, 2015).
Office Action in corresponding U.S. Appl. No. 13/539,166 (Apr. 24, 2015).
Final Office Action in corresponding U.S. Appl. No. 13/539,166 (Dec. 18, 2014).
Office Action in corresponding U.S. Appl. No. 13/539,166 (Jun. 25, 2014).
"3$^{rd}$ Generation Partnership Project; Technical Specification Group Radio Access Network; Evolved Universal Terrestrial Radio Access (E-UTRA) Medium Access Control (MAC) protocol specification (Release 8)," 3GPP TS 36.321, V8.5.0, pp. 1-46, 3$^{rd}$ Generation Partnership Project, Valbonne, France (Mar. 2009).
"3$^{rd}$ Generation Partnership Project; Technical Specification Group Radio Access Network; Evolved Universal Terrestrial Radio Access (E-UTRA) Medium Access Control (MAC) protocol specification (Release 8)," 3GPP TS 36.321, V8.0.0, pp. 1-23, 3$^{rd}$ Generation Partnership Project, Valbonne, France (Dec. 2007).
"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V8.2.0, pp. 1-109, 3$^{rd}$ Generation Partnership Project, Valbonne, France (Sep. 2007).
"TP to 36.912 on Relays and Carrier Aggregation," 3GPP TSG-RAN WG2 Meeting #66bis, Los Angeles, California, R2-094083, 3$^{rd}$ Generation Partnership Project, Valbonne, France (Jun. 29-Jul. 3, 2009).
"3$^{rd}$ Generation Partnership Project; Technical Specification Group Radio Access Network; Feasibility study for Further Advancements for E-UTRA (LTE-Advanced) (Release 9)," 3GPP TR 36.912, V9.1.0, pp. 1-58, 3$^{rd}$ Generation Partnership Project, Valbonne, France (Dec. 2009).
"3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300, V9.1.0, pp. 1-165, 3$^{rd}$ Generation Partnership Project, Valbonne, France (Sep. 2009).
"3$^{rd}$ Generation Partnership Project; Technical Specification Group Radio Access Network; Evolved Universal Terrestrial Radio Access (E-UTRA) Medium Access Control (MAC) protocol specification (Release 9)," 3GPP TS 36.321, V9.0.0, pp. 1-47, 3$^{rd}$ Generation Partnership Project, Valbonne, France (Sep. 2009).

* cited by examiner

INFORMATION FEEDBACK METHOD AND APPARATUS

CROSS-REFERENCE TO RELATED APPLICATIONS

This application is a continuation of International Application No. PCT/CN2010/080555, filed on Dec. 31, 2010, which claims priority to Chinese Patent Application No. 200910238885.8, filed on Dec. 31, 2009, Chinese Patent Application No. 200910238884.3, filed on Dec. 31, 2009, and Chinese Patent Application No. 200910238879.2, filed on Dec. 31, 2009, all of which are hereby incorporated by reference in their entireties.

FIELD OF THE INVENTION

The present invention relates to the field of communications, and in particular, to an information feedback technology.

BACKGROUND OF THE INVENTION

In a communication system, several solutions are proposed in order to reduce delay in a signaling plane and a user plane. The technical solutions include: reducing a scheduling period of an RACH (random access channel, Random Access Channel), reducing a period of a PUCCH (physical uplink control channel, Physical Uplink Control Channel), reducing processing delay of a UE (User Equipment, user equipment) and an eNB (Evolved Node B, evolved node B), and using a CB (Contention Based, contention based) resource for uplink information.

The use of the CB resource for uplink information enables a small amount of data to be fast and effectively transmitted when there is no dedicated uplink transmission resource. The CB resource is not dedicated to a single UE, and can be used by all UEs in a cell.

A method for using a CB resource for uplink transmission is that: an eNB notifies, through a dedicated identifier CB-RNTI (Contention Based Radio Network Temporary Identifier, contention based radio network temporary identifier), all UEs in a cell of a contention based resource grant, and after detecting the CB resource, the UEs may perform uplink transmission on the CB resource. Especially, in a case of low network load, a user can implement uplink transmission of data as soon as possible through CB resource allocation.

After receiving the uplink information, if the uplink information is correctly decoded, an eNB feeds back an ACK through a PHICH (Physical Hybrid-ARQ Indicator Channel, physical hybrid-arq indicator channel), and if the uplink information is not correctly decoded, the eNB feeds back a NACK through the PHICH. This feedback method may cause that a UE with conflict also receives an ACK, thereby resulting in mistakenly decision of correct transmission. As a result, loss of this part of UE data or retransmission delay may be caused.

SUMMARY OF THE INVENTION

Embodiments of the present invention provide an information feedback method and apparatus, so that a sending end may clearly know whether uplink transmission of the sending end on a CB resource is successfully decoded by a receiving end.

An embodiment of the present invention provides an information feedback method, where the method includes:

receiving, by a network device, uplink information that is sent by a sending device on a CB resource; and feeding back, by the network device, correct reception of the uplink information to the sending device through a first PDCCH (Physical Downlink Control Channel, physical downlink control channel) masked with an identifier of the sending device, when the uplink information is decoded.

An embodiment of the present invention provides an information feedback method, where the method includes:

receiving, by a network device, uplink information that is sent by a sending device on a CB resource;

detecting, by the network device, conflict on a CB resource block that bears the uplink information; and sending, by the network device, a retransmission indication through a PDCCH masked with a CB-RNTI, when the uplink information is not decoded and no conflict is detected.

An embodiment of the present invention provides an information feedback method, where the method includes:

receiving, by a network device, uplink information that is sent by a sending device on a CB resource;

detecting, by the network device, conflict on a CB resource block that bears the uplink information;

feeding back, by the network device, correct reception of the uplink information to the sending device through an MAC CE, when the uplink information is decoded; and sending, by the network device, a retransmission indication through a PDCCH masked with a CB-RNTI, when the uplink information is not decoded and no conflict is detected.

An embodiment of the present invention provides an information feedback method, where the method includes:

receiving, by a network device, uplink information that is sent by a sending device on a CB resource;

feeding back, by the network device, correct reception of the uplink information to the sending device through an MAC CE (media access control layer control element), when the uplink information is decoded; and feeding back, by the network device, incorrect reception through a PHICH, when the uplink information is not decoded.

An embodiment of the present invention provides an information retransmission acknowledgement method, where the method includes:

monitoring, by a sending device, first PDCCH signaling, where the first PDCCH signaling is masked with an identifier of the sending device;

if the first PDCCH signaling is monitored, acknowledging, by the sending device, that uplink information does not need to be retransmitted, where the uplink information is sent by the sending device on a CB resource.

An embodiment of the present invention provides an information retransmission acknowledgement method, where the method includes:

receiving, by a sending device, an MAC CE, which is used to feed back that uplink information is received correctly by a network side, where the uplink information is sent by the sending device on a contention based CB resource;

monitoring, by the sending device, PDCCH signaling, where the PDCCH signaling is masked with a CB-RNTI; and one of the following steps:

if the PDCCH signaling is monitored, acknowledging, by the sending device and according to a retransmission indication carried in the PDCCH signaling, that synchronous HARQ (hybrid automatic repeat request) retransmission needs to be performed;

if the MAC CE is received correctly, acknowledging, by the sending device, that retransmission does not need to be performed; and if the MAC CE is not received correctly and the PDCCH signaling is not received, acknowledging, by the sending device, that retransmission needs to be performed after backoff.

An embodiment of the present invention provides an information retransmission acknowledgement method, where the method includes:

receiving, by a sending device, an MAC CE, which is used to feed back correct reception of uplink information by a network side, where the uplink information is sent by the sending device on a contention based CB resource;

monitoring, by the sending device, PHICH signaling, to obtain feedback about incorrect reception of the uplink information from the network side; and one of the following steps:

if the PHICH signaling is monitored, acknowledging, by the sending device, that retransmission of the uplink information needs to be performed;

if the MAC CE is received correctly, acknowledging, by the sending device, that retransmission of the uplink information does not need to be performed; and if the MAC CE is not received correctly, acknowledging, by the sending device, that retransmission of the uplink information needs to be performed.

An embodiment of the present invention provides a data sending method, where the method includes:

configuring, by a sending device, a CB buffer, where the CB buffer is used to store uplink data and/or a buffer status report BSR, where the uplink data and/or the buffer status report BSR is to be sent on a CB resource;

placing, by the sending device, the uplink data and/or the BSR, where the uplink data and/or the BSR is to be sent, in the CB buffer; and sending, by the sending device, the uplink data and/or the BSR, where the uplink data and/or the BSR is stored in the CB buffer, on the CB resource.

An embodiment of the present invention provides a network device, where the network device includes:

a receiving module, configured to receive uplink information that is sent by a sending device on a CB resource;

a decoding module, configured to decode the uplink information received by the receiving module; and a first notifying module, configured to feed back correct reception of the uplink information to the sending device through a first PDCCH masked with an identifier of the sending device, when the decoding module decodes the uplink information.

An embodiment of the present invention provides a network device, where the network device includes:

a receiving module, configured to receive uplink information that is sent by a sending device on a CB resource;

a decoding module, configured to decode the uplink information received by the receiving module;

a detecting module, configured to detect conflict on a CB resource block that bears the uplink information; and a notifying module, configured to send a retransmission indication through a PDCCH masked with a CB-RNTI, when the decoding module does not decode the uplink information and the detecting module detects no conflict.

An embodiment of the present invention provides a network device, where the network device includes:

a receiving module, configured to receive uplink information that is sent by a sending device on a CB resource;

a detecting module, configured to detect conflict on a CB resource block that bears the uplink information;

a decoding module, configured to decode the uplink information received by the receiving module;

a first notifying module, configured to feed back correct reception of the uplink information to the sending device through an MAC CE, when the decoding module decodes the uplink information; and a second notifying module, configured to send a retransmission indication through a PDCCH masked with a CB-RNTI, when the decoding module does not decode the uplink information and the detecting module detects no conflict.

An embodiment of the present invention provides a network device, where the network device includes:

a receiving module, configured to receive uplink information that is sent by a sending device on a CB resource;

a decoding module, configured to decode the uplink information received by the receiving module;

a first notifying module, configured to feed back correct reception of the uplink information to the sending device through an MAC CE, when the decoding module decodes the uplink information; and a second notifying module, configured to feed back incorrect reception of the uplink information through a PHICH, when the decoding module does not decode the uplink information.

An embodiment of the present invention provides a sending device, where the sending device includes:

a monitoring module, configured to monitor PDCCH signaling masked with an identifier of the sending device; and a first acknowledgement module, configured to, when the monitoring module monitors the PDCCH signaling, acknowledge that retransmission of the uplink information does not need to be performed.

An embodiment of the present invention provides a sending device, where the sending device includes:

a receiving module, configured to receive an MAC CE, which is used to feed back that uplink information is received correctly by a network side, where the uplink information is sent by the sending device on a contention based CB resource;

a monitoring module, configured to monitor PDCCH signaling masked with a CB-RNTI; and one or any combination of the following modules:

a first acknowledgement module, configured to, when the monitoring module monitors the PDCCH signaling, according to a retransmission indication carried in the PDCCH signaling, acknowledge that synchronous HARQ retransmission needs to be performed;

a second acknowledgement module, configured to, when the receiving module correctly receives the MAC CE, acknowledge that retransmission of the uplink information does not need to be performed; and a third acknowledgement module, configured to, when the receiving module does not correctly receive the MAC CE, acknowledge that retransmission of the uplink information needs to be performed after backoff.

An embodiment of the present invention provides a sending device, where the sending device includes:

a CB buffer, configured to store uplink data and/or a buffer status report BSR;

a placing module, configured to place uplink data and/or a BSR, where the uplink data and/or the BSR is to be sent on a CB resource, in the CB buffer; and a transceiver module, configured to send the uplink data and/or the BSR, where the uplink data and/or the BSR is in the CB buffer, on the CB resource.

According to a CB resource feedback method provided in the embodiments of the present invention, correct reception is fed back through an MAC CE or a PDCCH, so that the sending device may be enabled to accurately know that the uplink information sent by the sending device is received correctly; or retransmission or incorrect reception is fed back through a PDCCH or a PHICH, so that the sending device may be enabled to know a receiving status more quickly, and acknowledge retransmission needs to be performed. According to the CB resource sending method provided in the embodiments of the present invention, the uplink data and/or the BSR, where the uplink data and/or the BSR is to be sent, can be successfully sent on the CB resource.

BRIEF DESCRIPTION OF THE DRAWINGS

To illustrate technical solutions in embodiments of the present invention or in the prior art more clearly, accompanying drawings for describing the embodiments or the prior art are introduced briefly in the following. Apparently, the accompanying drawings in the following description are only some embodiments of the present invention, and persons of ordinary skill in the art can derive other drawings from these accompanying drawings without creative efforts.

DETAILED DESCRIPTION OF THE EMBODIMENTS

The technical solutions in the embodiments of the present invention are clearly and completely described in the following with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

The following embodiments of the present invention take an LTE-A (Long Term Evolution Advance, long term evolution) system for example, but are not limited to applications in the LTE-A system, and may also be applied in other wireless communication systems, such as an LTE system and a UMTS system.

Figure 1A:
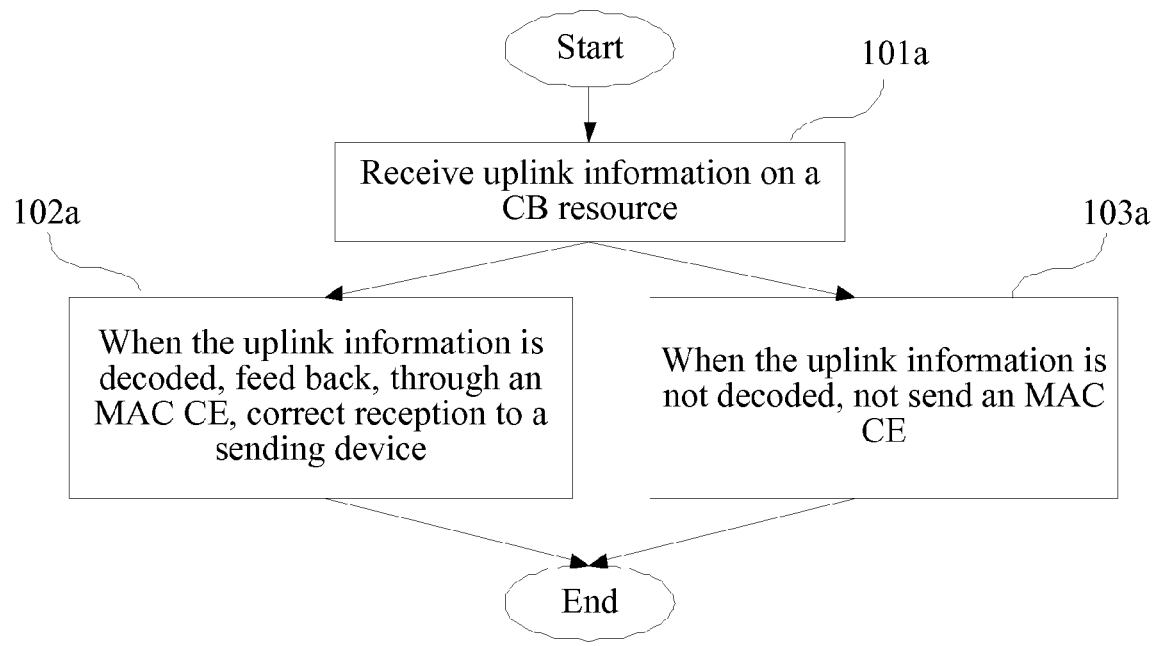
FIG. 1a is a schematic flowchart of a CB resource feedback method according to an embodiment of the present invention.

As shown in FIG. 1a, an embodiment of the present invention provides a CB resource feedback method, where the method includes:

Step 101a: A network device receives uplink information that is sent by a sending device on a CB resource.

This embodiment and the following embodiments may all be applied in a relay scenario and a non-relay scenario. When an application is in the relay scenario, the network device may be an eNB, and the sending device is a relay station or a UE; or, the network device may be a relay station, and the sending device is a UE.

The uplink information is content of uplink transmission, and includes uplink data, a BSR, and so on.

In this embodiment, the sending device performs the uplink transmission on the CB resource, and may either send uplink data or send a BSR (Buffer Status Report, buffer status report). And the uplink data and the BSR may also be sent at the same time.

Step 102a: When the network device decodes the uplink information, the network device feeds back correct reception to the sending device through an MAC CE (Media Access Control Control Element, media access control control element).

Step 103a: When the network device does not decode the uplink information, the network device does not send an MAC CE.

In this embodiment, the network device may feed back correct reception or incorrect reception to the sending device through an MAC CE or though no MAC CE.

In this embodiment, step 102a and step 103a may exist independently, that is, correct reception is fed back only through step 102a, or incorrect reception is fed back only through step 103a.

In this embodiment, furthermore, in order to determine whether the correct reception is performed by the network device more quickly, step 102*a* and step 103*a* may be limited at a time point or in a time period. For example, when the network device decodes the uplink information, the network device feeds back correct reception to the sending device through an MAC CE at a first time point or in a first time period. When the network device does not decode the uplink information, the network device does not send an MAC CE at the first time point or in the first time period.

In this embodiment, the first time point is a time point after the uplink information is transmitted, and the first time period is a time period after the uplink information is transmitted, that is, the first time point and the first time period are both later than a transmission time point of the uplink information. The network device and the sending device both know the first time point and/or the first time period. The first time point and the first time period may be variable, may also be fixed, may be preset, and may also be configured by a network side. Moreover, there is no specific relationship between the first time point and the first time period, and it is not limited that the first time point needs to be within the first time period, or to be an endpoint of the first time period, and so on.

For example, the sending device transmits uplink information at a time point T1, for the uplink information at the time point T1, the network device feeds back correct reception through an MAC CE at a time point T1+4, or does not send an MAC CE at the time point T1+4, so that the sending device is enabled to know incorrect reception is performed by the network device.

For example, the sending device transmits uplink information at a time point T2, for the uplink information at the time point T2, the network device feeds back correct reception through an MAC CE in a time period T2+4 to T2+8, or does not send an MAC CE in the time period T2+4 to T2+8, so that the sending device is enabled to know incorrect reception is performed by the network device.

In this embodiment, in the case of not receiving the MAC CE correctly, the sending device continues to receive a retransmitted MAC CE.

Through the CB resource feedback method provided in this embodiment, because the MAC CE is for each sending device, each sending device may be enabled to accurately know whether its uplink information is correctly received by the network device, which avoids that when correct reception is fed back through a PHICH, all the sending devices monitoring a PHICH regard that their corresponding uplink information is received correctly, thereby leading to a packet loss or a retransmission delay.

This embodiment and the following embodiments may be used in combination with a CB resource allocation method or configuration method.

Figure 1B:
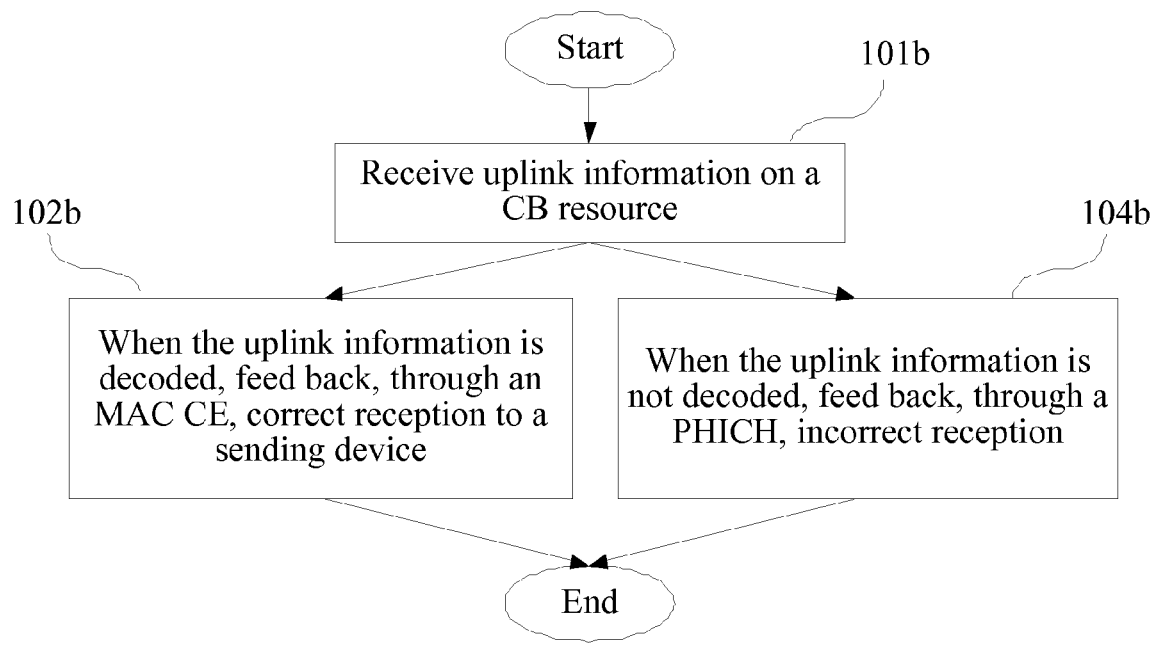
FIG. 1b is a schematic flowchart of another CB resource feedback method according to an embodiment of the present invention.

As shown in FIG. 1*b*, an embodiment of the present invention provides another CB resource feedback method, where the method includes:

Step 101*b*: A network device receives uplink information that is sent by a sending device on a CB resource.

Step 102*b*: When the network device decodes the uplink information, the network device feeds back correct reception to the sending device through an MAC CE.

Step 104*b*: When the network device does not decode the uplink information, the network device feeds back incorrect reception through a PHICH (physical hybrid automatic repeat request indicator channel, Physical Hybrid Automatic Repeat Request Indicator Channel).

In this embodiment, step 102*b* may also be that when the network device decodes the uplink information, the network device feeds back correct reception to the sending device through an MAC CE at a first time point or in a first time period. For details about the meaning of the first time point or the first time period, reference may be made to the embodiment shown in FIG. 1*a*.

In this embodiment, step 104*b* may also be that when the network device does not decode the uplink information, the network device feeds back incorrect reception through a PHICH at a second time point or in a second time period. For details about the meaning of the second time point or the second time period, reference may be made to the first time point or the first time period in the embodiment shown in FIG. 1*a*.

In this embodiment, the first time point and the second time point may be the same, and may also be different, and the first time period and the second time period may be the same, and may also be different.

Specifically, in order to enable the sending device to know incorrect reception is performed by a network side more quickly and acknowledge that retransmission needs to be performed more quickly, in this embodiment, the first time point may be, for example, the same as the second time point or later than the second time point; or, the first time point may also be later than the second time period; or, the first time period may be later than the second time point; or, the second time point may be later than the start time of the first time period and earlier than the end time of the first time period; or, the second time period does not coincide with the first time period, and is earlier than the first time period; or, the second time period coincides with the first time period, and the end time of the second time period is earlier than the end time of the first time period. Through the foregoing limitations on the first time point, the first time period, the second time point, and the second time period, it may be enabled that incorrect reception may be fed back through the PHICH earlier than the end time of the first time period, so that a user equipment may be enabled to know incorrect reception is performed by the network side more quickly, and retransmission may be performed more quickly. Feedback through the PHICH and feedback through the MAC CE are at one time point, however, detecting whether an MAC CE exists also needs a certain period of time, while incorrect reception is known more quickly through monitoring the PHICH.

For example, when the sending device transmits uplink information at a time point T1, for the uplink information at the time point T1, the network device may feed back incorrect reception through the PHICH at a time point T1+4; or, the network device may feed back correct reception through the MAC CE at a time point T1+6.

Through the CB resource feedback method provided in this embodiment, the sending device is enabled to accurately know whether its uplink information is received correctly by the network side, and furthermore, feeding back incorrect reception through a PHICH may enable a sending device that monitors the PHICH to know that its corresponding uplink information is not received by network device correctly, and a receiving status of the network device can be fed back to the sending device more quickly. Moreover, when incorrect reception is fed back through an MAC CE and a sending device does not receive the feedback correctly, a retransmission needs to be performed, thereby causing retransmission time, which can be avoided by feeding back incorrect reception through a PHICH.

In this embodiment, feeding back correct reception through a PHICH at a first time point or in a first time period may also be included; and feeding back correct reception through a PHICH at a second time point or in a second time period may also be included.

In this embodiment, when the uplink information is not decoded, incorrect reception may also be fed back by not sending an MAC CE at a first time point or in a first time period.

Figure 1C:
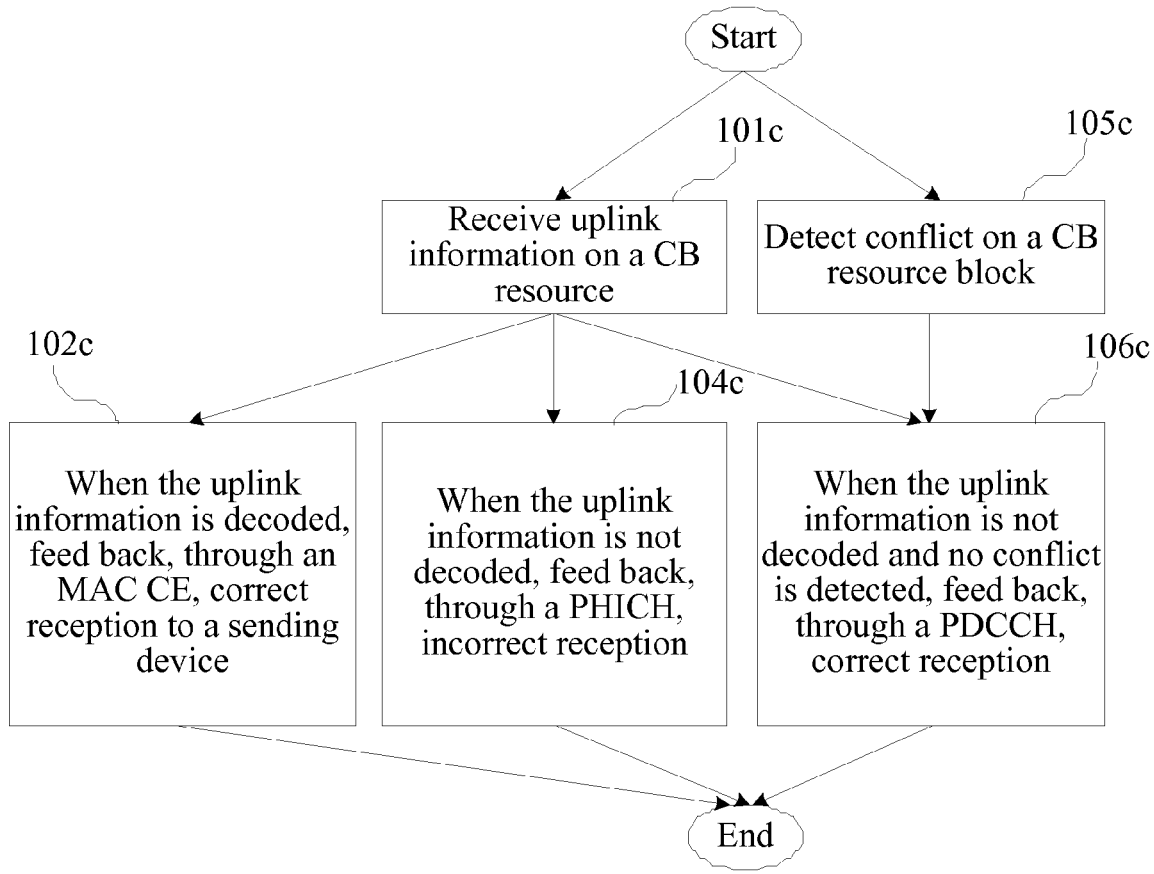
FIG. 1c is a schematic flowchart of another CB resource feedback method according to an embodiment of the present invention.

As shown in FIG. 1c, an embodiment of the present invention provides another CB resource feedback method. The method includes:

Step 101c: A network device receives uplink information that is sent by a sending device on a CB resource.

Step 102c: When the network device decodes the uplink information, the network device feeds back correct reception to the sending device through an MAC CE.

Step 104c: When the network device does not decode the uplink information, the network device feeds back incorrect reception through a PHICH.

For specific implementation of the foregoing three steps, reference may be made to the embodiments shown in FIG. 1a and FIG. 1b.

Step 105c: The network device detects conflict on a CB resource block that bears the uplink information.

Step 106c: When the uplink information is not decoded and no conflict is detected, the network device sends a retransmission indication through a PDCCH (Physical Downlink Control Channel, physical downlink control channel) masked with a CB-RNTI (CB-Radio Network Temporary Identifier, contention based radio network temporary identifier).

In this embodiment, step 106c may be, for example, limited at a third time point or in a third time period. The third time point is later than a transmission time point of the uplink information.

In this embodiment, for example, step 104c may not be included.

In this embodiment, in step 106c, the PDCCH may, for example, adopt a new format, and may also use an existing format. If an existing format is used, for example, an NDI (New Data Indicator, new data indicator) field may be used, and the NDI is set for retransmission. For example, when the NDI is set to 1, it indicates new transmission, and the NDI may be set to 0 to indicate retransmission; or when the NDI is set to 0, it indicates new transmission, and the NDI may be set to 1 to indicate retransmission. Further, other fields in the existing format may be used to indicate retransmission.

In this embodiment, through incorrect reception fed back in step 104c, the sending device is enabled to know incorrect reception is performed by a network side, and prepare for retransmission; through incorrect reception fed back in step 106c, the sending device is enabled to know incorrect reception is performed by the network side and know a resource used for retransmission. Therefore, according to the feedback in step 106c, the sending device may perform synchronous HARQ (Hybrid Automatic Repeat Request) retransmission. The synchronous HARQ retransmission may be performed on a CB resource, and may also be performed on a dedicated resource.

In this embodiment, the first time point, the second time point and the third time point may, for example, satisfy one of the following conditions: The first time point, the second time point and the third time point are the same; the first time point and the third time point are the same, and are later than the second time point; the first time point is later than the third time point, and the third time point and the second time point are the same; the third time point is later than the first time point, and the first time point and the second time point are the same; the first time point is later than the third time point, and the third time point is later than the second time point; and the third time point is later than the first time point, and the first time point is later than the second time point. Through the foregoing limitations on the time points, the sending device may be enabled to know whether the correct reception is performed by the network side as soon as possible.

In this embodiment, the first time period, the second time period and the third time period may, for example, satisfy one of the following conditions: The first time period, the second time period and the third time period are the same; the first time period and the third time period are the same, and the end time of the second time period is earlier than the end time of the first time period; the end time of the first time period is later than the end time of the third time period, and the end time of the third time period is later than the end time of the second time period; the end time of the first time period is later than the end time of the third time period, and the third time period and the second time period are the same; the end time of the third time period is later than the end time of the first time period; and the end time of the third time period is later than the end time of the first time period, and the end time of the first time period is later than the end time of the second time period. Through the foregoing limitations on the time periods, the sending device may be enabled to know whether the correct reception is performed by the network side as soon as possible.

In this embodiment, for a relationship between the time points and the time periods, reference may be made to the foregoing condition limitations, which aims at enabling the sending device to know whether the correct reception is performed by the network side as soon as possible.

Through the feedback method provided in this embodiment, different sending devices may be enabled to accurately know whether their uplink information is received correctly by a network side, and know the receiving status as soon as possible.

Further, the embodiments shown in FIG. 1a, FIG. 1b and FIG. 1c may be combined, and more embodiments may be obtained through the combination.

Figure 2A:
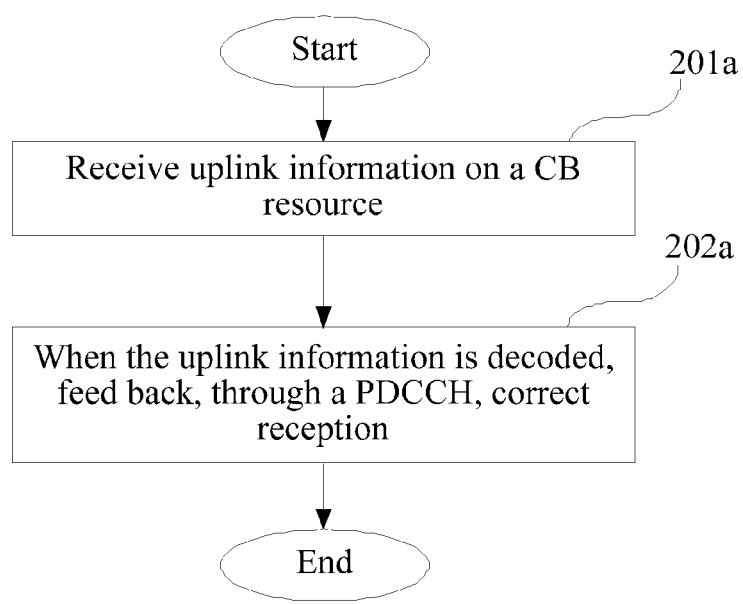
FIG. 2a is a schematic flowchart of another CB resource feedback method according to an embodiment of the present invention.

As shown in FIG. 2a, an embodiment of the present invention provides another CB resource feedback method. The method includes:

Step 201a: A network device receives uplink information that is sent by a sending device on a CB resource.

Step 202a: When the network device decodes the uplink information, the network device feeds back correct reception to the sending device through a PDCCH masked with an identifier of the sending device.

In this embodiment, step 202a may be, for example, when the network device decodes the uplink information, the network device feeds back correct reception to the sending device, through a PDCCH masked with an identifier of the sending device at a first time point or in a first time period. For specific meaning of the first time point or the first time period, reference may be made to the embodiment shown in FIG. 1a.

In this embodiment, an identifier of the sending device is used for masking, for example, a C-RNTI (Cell Radio link Temporary Identifier) or other identifiers that may uniquely identify the sending device may be used for masking In this embodiment, the format of the PDCCH may be a new format, and is dedicated to indicate correct reception. Adopting a new format that is different from an existing format is mainly for the purpose of indicating correct reception through the format without the need of more resources. The PDCCH may also be an existing format, and a redundant state or a specific value in the existing format is used to indicate correct reception. For example, a redundant state in an NDI field, an MCS (Modulation and Coding Scheme, modulation and coding scheme) field or a HARQ field, where the NDI field, the MCS field or the HARQ field is in an existing format 1 or 1a, is used to indicate correct reception. For example, in a PDCCH of the format 1 or 1a, an MCS field is 5 bits, and may indicate $2^5$ states, 29 states among which are used at present, and redundant states are 11101, 11110 and 11111, therefore, one or multiple of the redundant states may be used to indicate correct reception.

For example, one or multiple specific values in the NDI field, the MCS field or the HARQ field, where the NDI field, the MCS field or the HARQ field is in the format 1 or 1a, is used to indicate correct reception. For example, in the PDCCH of the format 1 or 1a, the MCS field is set to all 0, and the HARQ is set to all 1, so as to indicate correct reception.

Through the feedback method provided in this embodiment, because the PDCCH is masked with the identifier of the sending device, the PDCCH is dedicated to each sending device, so that a sending device may accurately know whether the uplink information sent by the sending device is received correctly by a network side.

Figure 2B:
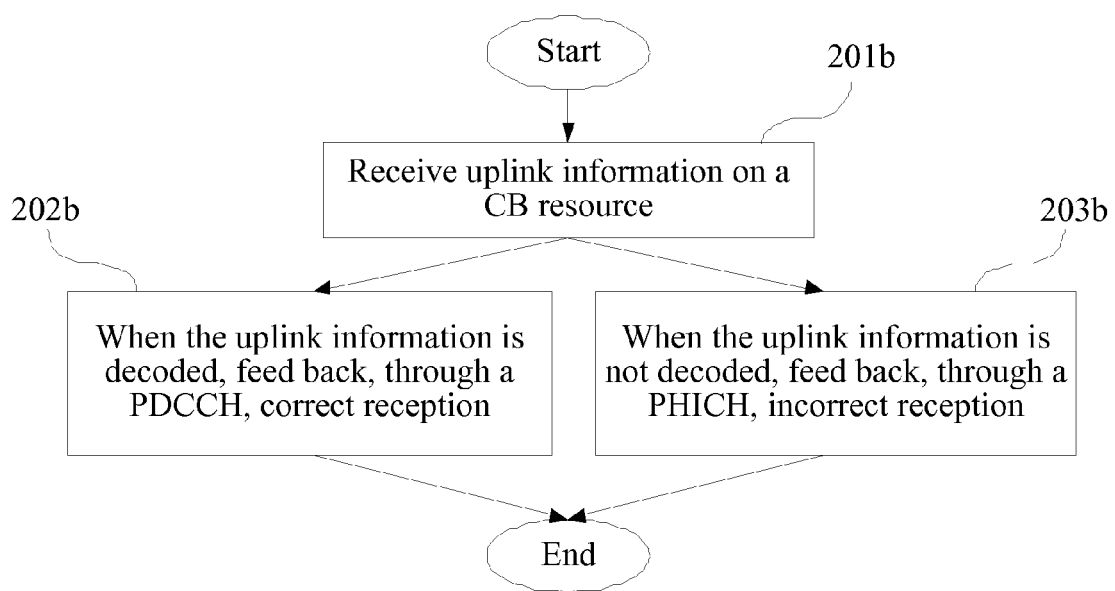
FIG. 2b is a schematic flowchart of another CB resource feedback method according to an embodiment of the present invention.

As shown in FIG. 2b, an embodiment of the present invention provides another CB resource feedback method. The method includes:

Step 201b: A network device receives uplink information that is sent by a sending device on a CB resource.

Step 202b: When the network device decodes the uplink information, the network device feeds back correct reception to the sending device through a PDCCH masked with an identifier of the sending device.

For specific implementation of steps 201b and 202b, reference may be made to the embodiment shown in FIG. 2a.

Step 203b: When the network device does not decode the uplink information, the network device feeds back incorrect reception through a PHICH.

Step 202b may be, for example, limited at a first time point or in a first time period, and step 203b may be, for example, limited at a second time point or in a second time period.

For implementation of the step and specific limitations on the second time point, the second time period, the first time point and the first time period, reference may be made to the embodiments of FIG. 1b and FIG. 1c.

Through the CB resource feedback method provided in this embodiment, whether a network side receives the uplink information correctly may be notified to the sending device through the PDCCH. Moreover, notification by using the PDCCH may enable the sending device to know, when decoding the PDCCH, whether the uplink information is received correctly, so that the sending device may know a receiving status of the uplink information more quickly. Moreover, notification by using the PDCCH masked with a C-RNTI may avoid retransmission, that is, when a sending end does not correctly decode the PDCCH, it may be acknowledged that retransmission needs to be performed without waiting for retransmission.

Further, the embodiments shown in FIG. 2a and FIG. 2b may be combined with the embodiments shown in FIG. 1a, FIG. 1b and FIG. 1c, and in a combined embodiment, when it is needed to feed back correct reception, feedback may be performed through an MAC CE and a PDCCH masked with a C-RNTI, and/or when incorrect reception occurs, it is fed back through not sending an MAC CE and through a PDCCH masked with a C-RNTI, or incorrect reception is fed back through a PHICH.

Figure 2C:
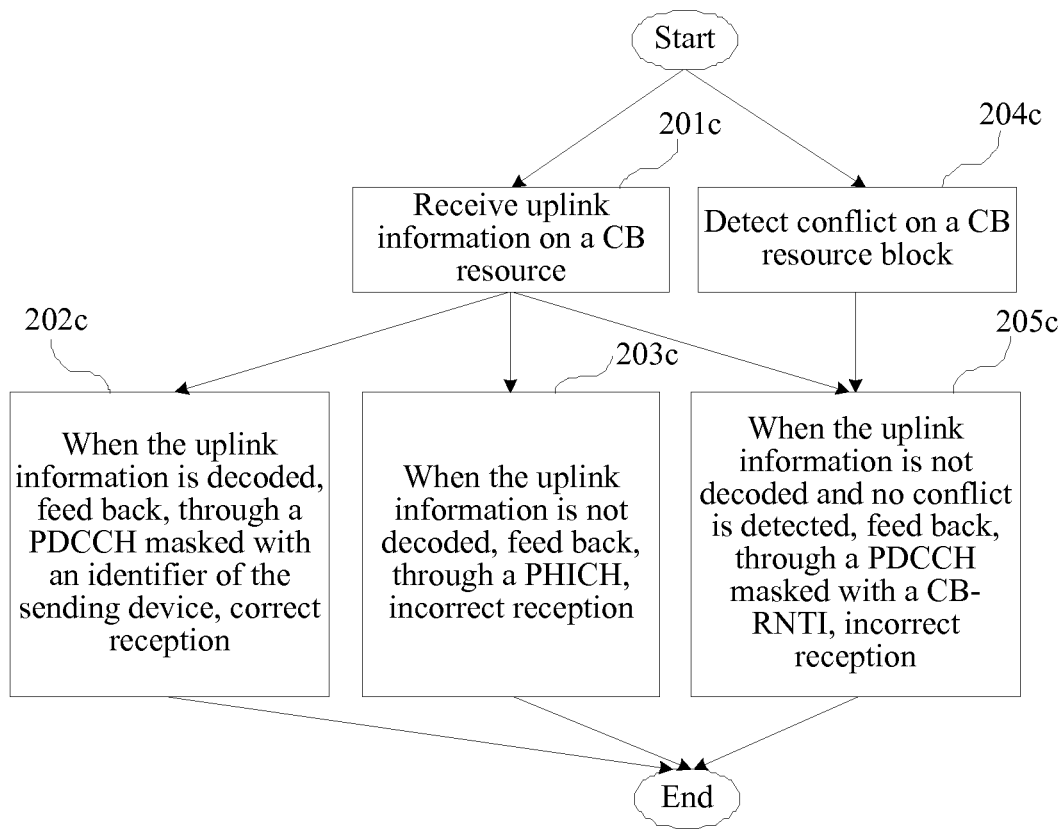
FIG. 2c is a schematic flowchart of another CB resource feedback method according to an embodiment of the present invention.

As shown in FIG. 2c, an embodiment of the present invention provides another CB resource feedback method. The method includes:

Step 201c: A network device receives uplink information that is sent by a sending device on a CB resource.

Step 202c: When the network device decodes the uplink information, the network device feeds back correct reception to the sending device through a PDCCH masked with an identifier of the sending device.

For specific implementation of steps 201c and 202c, reference may be made to the embodiment shown in FIG. 2a.

Step 203c: When the network device does not decode the uplink information, the network device feeds back incorrect reception through a PHICH.

For specific implementation of step 203c, reference may be made to the embodiment shown in FIG. 2b.

Step 204c: The network device detects conflict on a CB resource block that bears the uplink information.

Step 205c: When the uplink information is not decoded and no conflict is detected, the network device feeds back incorrect reception through a PDCCH masked with a CB-RNTI.

In this embodiment, step 202c may be, for example, limited at a first time point or in a first time period, step 203c may be, for example, limited at a second time point or in a second time period, and step 205c may be, for example, limited at a third time point or in a third time period. The third time point is later than a transmission time point of the uplink information.

For specific implementation of steps 204c and 205c and specific limitations on the third time point or the third time period, reference may be made to the embodiment shown in FIG. 1c.

Figure 3A:
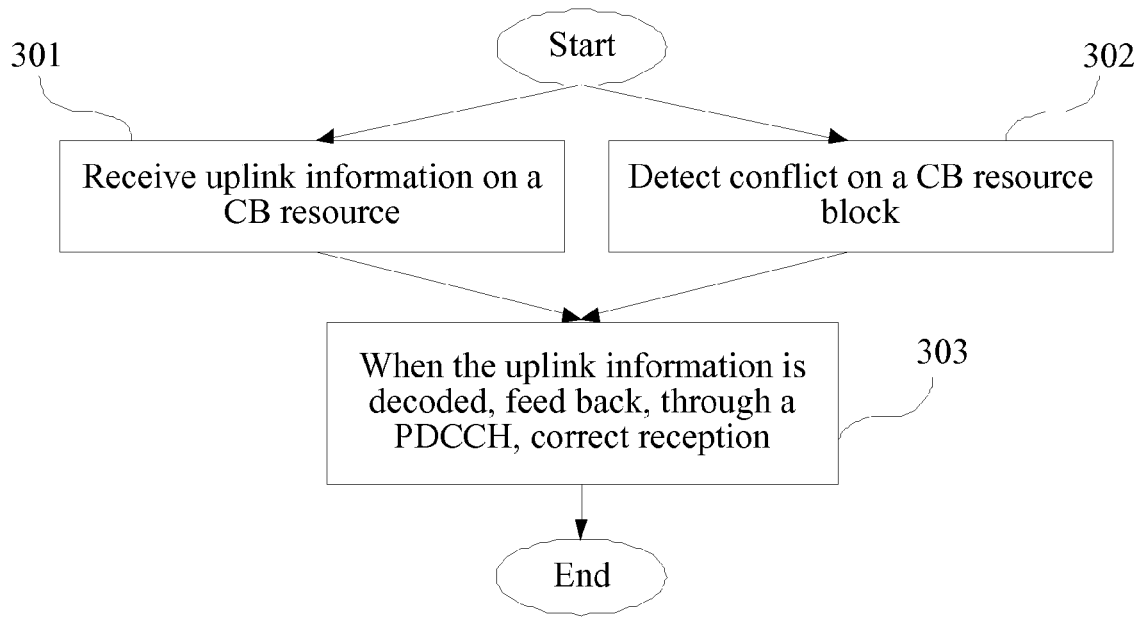
FIG. 3a is a schematic flowchart of another CB resource feedback method according to an embodiment of the present invention.

As shown in FIG. 3a, an embodiment of the present invention provides another CB resource feedback method. The method includes:

Step 301: A network device receives uplink information that is sent by a sending device on a CB resource.

Step 302: The network device detects whether conflict occurs on a CB resource block that bears the uplink information.

In this embodiment, the network device may detect whether conflict occurs on the CB resource, so that the network device may know whether it is because of the conflict that the network device does not decode the uplink information on the CB resource correctly.

Step 303: When the uplink information is not decoded correctly and it is not detected that conflict occurs on the CB resource block, the network device notifies the sending device through a PDCCH masked with a CB-RNTI that synchronous HARQ (Hybrid Automatic Repeat reQuest, hybrid automatic repeat request) retransmission should be performed.

In this embodiment, the network device may notify the sending device that synchronous HARQ retransmission should be performed through, for example, setting an NDI field in the foregoing PDCCH.

When the uplink information is decoded correctly or the uplink information is not decoded correctly but it is detected that conflict occurs on the CB resource block that bears the uplink information, the network device may feed back correct reception or incorrect reception, by adopting the method shown in the foregoing embodiments.

In specific implementation of this embodiment, the network device may first detect whether conflict occurs on the CB resource, and then judge whether the uplink information can be decoded correctly; and the network device may also first judge whether the uplink information can be decoded correctly, and then detect whether conflict occurs on the CB resource, or may also proceed simultaneously.

Through the method provided in this embodiment, when no conflict occurs but the network device does not decode the uplink information correctly, the sending device may be notified that synchronous HARQ retransmission should be performed, so that the sending device is enabled to perform retransmission as soon as possible without backoff, and at the same time, conflict with another UE in retransmission may be avoided.

Figure 4A:
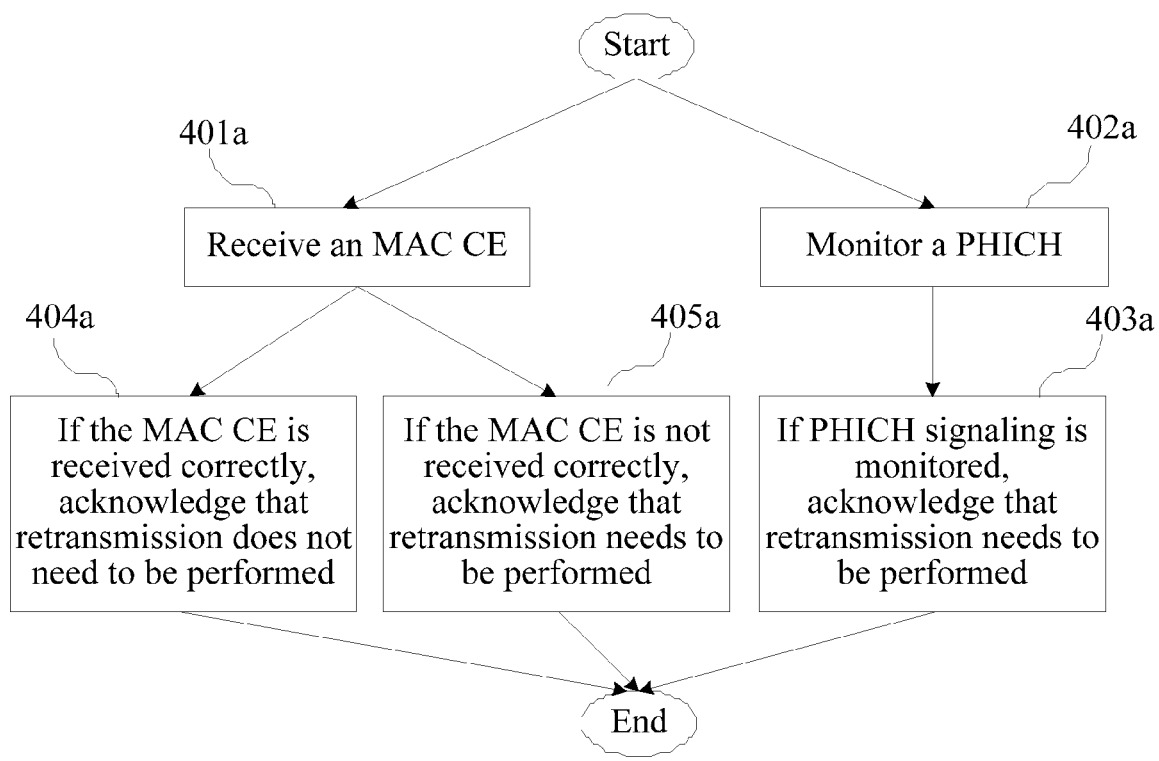
FIG. 4a is a schematic flowchart of a CB resource retransmission acknowledgement method according to an embodiment of the present invention.

As shown in FIG. 4a, an embodiment of the present invention provides a CB resource retransmission acknowledgement method. The method includes:

Step 401a: A sending device receives an MAC CE sent by a network device. The MAC CE is used to feed back that uplink information that is sent by the sending device on a CB resource is received correctly by a network side.

In this embodiment, the sending device sends the uplink information on the CB resource, while the network device feeds back whether the uplink information is received correctly.

Step 401a may be, for example, limited at a first time point or in a first time period.

In the first time period, receiving may be attempted for multiple times, and may also be attempted for one time. When an MAC CE is received incorrectly by the sending device, the MAC CE may be retransmitted. Therefore, when an MAC CE is received at a time point in a first time period and the MAC CE is received incorrectly, a retransmitted MAC CE may be continuously received at another time point. The another time point may be a time point in the first time period, and may also be a time point outside the first time period.

Step 402a: The sending device monitors PHICH signaling, to obtain feedback from the network side about incorrectly receiving the uplink information that is sent by the sending device on the CB resource.

Step 402a may be, for example, limited at a second time point or in a second time period.

The method provided in this embodiment may also include one or any combination of the following:

Step 403a: If PHICH signaling is monitored, the sending device acknowledges that retransmission needs to be performed.

In this embodiment, if a PHICH feeds back correct reception besides incorrect reception, PHICH signaling that feeds back incorrect reception needs to be monitored, so as to acknowledge that retransmission needs to be performed.

Step 404a: If the MAC CE is received correctly, the sending device acknowledges that retransmission does not need to be performed.

Step 405a: If the MAC CE is not received correctly, the sending device acknowledges that retransmission needs to be performed.

In this embodiment, for the first time point, the second time point, the first time period and the second time period, reference may be made to the embodiments shown in FIG. 1a, FIG. 1b and FIG. 1c.

Further, in this embodiment, when the second time point is earlier than the first time point or the second time point and the first time point are the same, if PHICH signaling is monitored, the sending device acknowledges that retransmission needs to be performed, without judging whether the MAC CE is received correctly, thereby energy of the sending device may be saved, and retransmission may be implemented as soon as possible.

Further, if a result of monitoring the PHICH signaling is DTX (discontinuous transmission, Discontinuous Transmission), the sending device judges, according to whether the MAC CE is received, whether correct reception is performed by the network side and starts retransmission accordingly.

In this embodiment, after retransmission is acknowledged, a step of retransmission may be included, and a CB resource may be used for retransmission, and a dedicated resource may also be requested for. The retransmission may be synchronous HARQ retransmission, and may also be retransmission after backoff for a period of time.

Through the CB resource retransmission acknowledgement method provided in this embodiment, whether correct reception is performed by the network side and whether retransmission needs to be performed may be known through receiving the MAC CE sent by the network side. Moreover, because the MAC CE is dedicated to each sending device, each sending device may be enabled to accurately know a receiving status of its uplink information, thereby avoiding misjudging.

Moreover, through the method provided in this embodiment, through monitoring the PHICH signaling, it may be accurately known that the network device does not receive the uplink information correctly, so that retransmission is started. Moreover, when the second time point and the first time point are the same or the second time point is earlier than the first time point, the sending device may judge in advance that incorrect reception is performed by the network device. When the end of the second time period is earlier than the end of the first time period, the sending device may also judge in advance that incorrect reception is performed by the network device, without waiting for the second time point or the end of the second time period to judge that incorrect reception is performed by the network device.

Figure 4B:
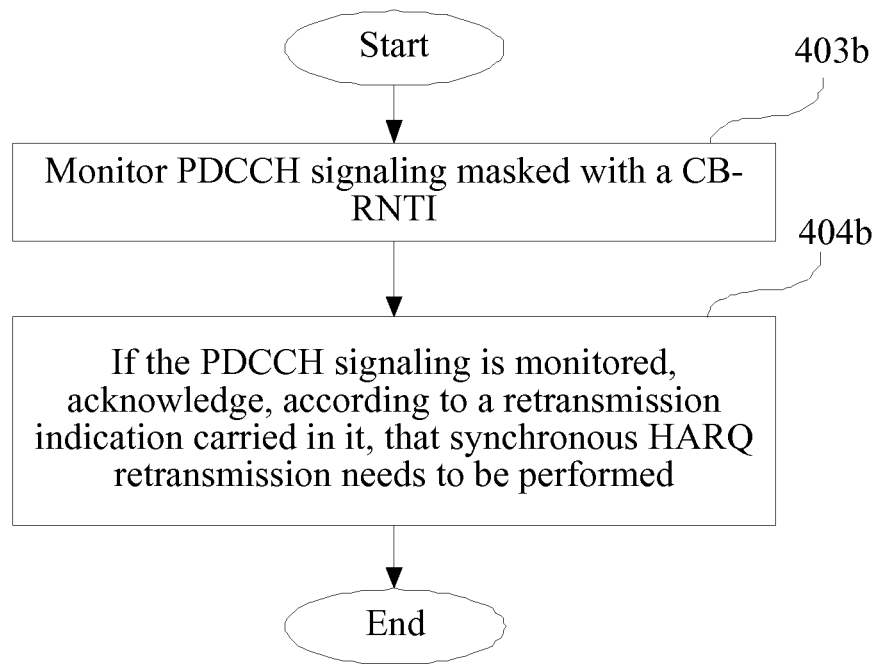
FIG. 4b is a schematic flowchart of another CB resource retransmission acknowledgement method according to an embodiment of the present invention.

As shown in FIG. 4b, the CB resource retransmission acknowledgement method provided in this embodiment may also include:

Step 403b: The sending device monitors PDCCH signaling masked with a CB-RNTI.

Step 403b may be, for example, limited at a third time point or in a third time period.

Step 404b: If the PDCCH signaling masked with a CB-RNTI is monitored, the sending device acknowledges, according to a retransmission indication carried in the PDCCH signaling, that synchronous HARQ retransmission needs to be performed.

In this embodiment, for details about a relationship between the third time point, the third time period and other time points and time periods, reference may be made to the embodiments shown in FIG. 1a, FIG. 1b and FIG. 1c.

Through the method provided in this embodiment, the sending device may be enabled to accurately know whether its uplink information is received correctly. Moreover, because a problem of retransmission caused by incorrect reception does not exist in the PDCCH, the sending device may know a receiving status of the network side without waiting for retransmission, and acknowledge whether retransmission needs to be performed.

Figure 5A:
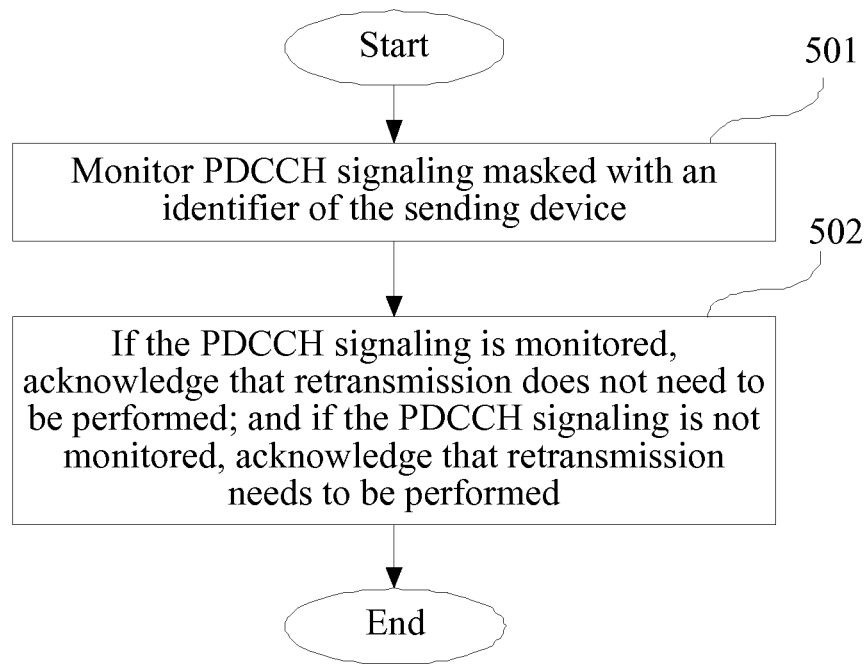
FIG. 5a is a schematic flowchart of another CB resource retransmission acknowledgement method according to an embodiment of the present invention.

As shown in FIG. 5a, an embodiment of the present invention provides another CB resource retransmission acknowledgement method. The method includes:

Step 501: A sending device monitors PDCCH signaling masked with an identifier of the sending device.

This step may be, for example, limited at a first time point or in a first time period.

In this embodiment, the PDCCH signaling masked with an identifier of the sending device may adopt a new format, and may also use an existing format. The new format may be a format that is dedicated to feed back whether correct reception is performed by a network side, and may also be used to bear other information. If an existing format is adopted, a redundant state or a specific value may be used to indicate whether correct reception is performed by the network side. For specific details, reference may be made to the corresponding description in the foregoing embodiments.

Step 502: If the PDCCH signaling masked with an identifier of the sending device is monitored, the sending device acknowledges that retransmission does not need to be performed; and if the PDCCH signaling masked with an identifier of the sending device is not monitored, the sending device acknowledges that retransmission needs to be performed.

Through the method provided in this embodiment, whether correct reception is performed by the network device may be judged through monitoring the PDCCH signaling masked with an identifier of the sending device, so as to perform retransmission more quickly and more accurately.

Figure 5B:
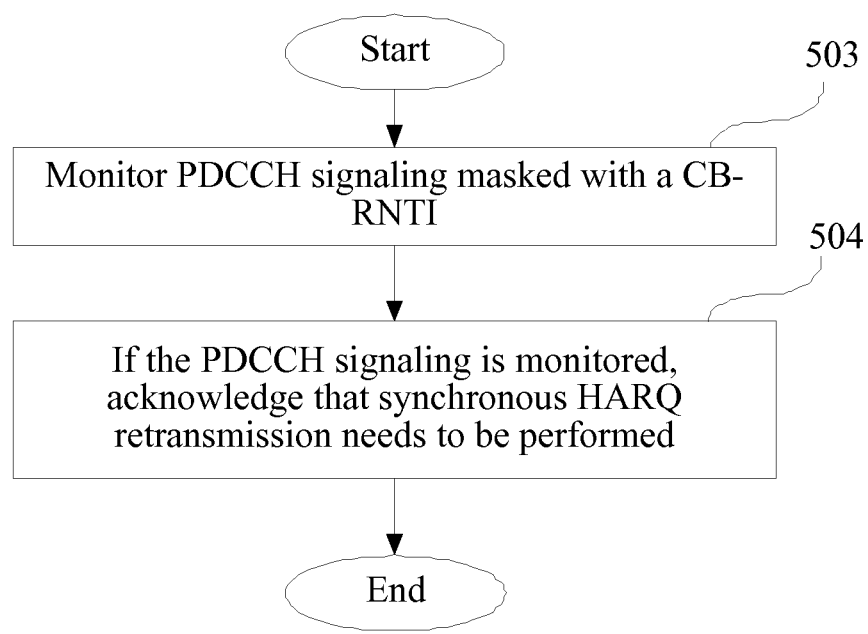
FIG. 5b is a schematic flowchart of another CB resource retransmission acknowledgement method according to an embodiment of the present invention.

As shown in FIG. 5b, an embodiment of the present invention provides another CB resource retransmission method. The method includes:

Step 503: A sending device monitors PDCCH signaling masked with a CB-RNTI.

This step may be, for example, limited at a third time point or in a third time period.

Step 504: If the PDCCH signaling masked with a CB-RNTI is monitored, the sending device acknowledges, according to a retransmission indication carried in the PDCCH signaling, that synchronous HARQ retransmission needs to be performed.

Figure 5C:
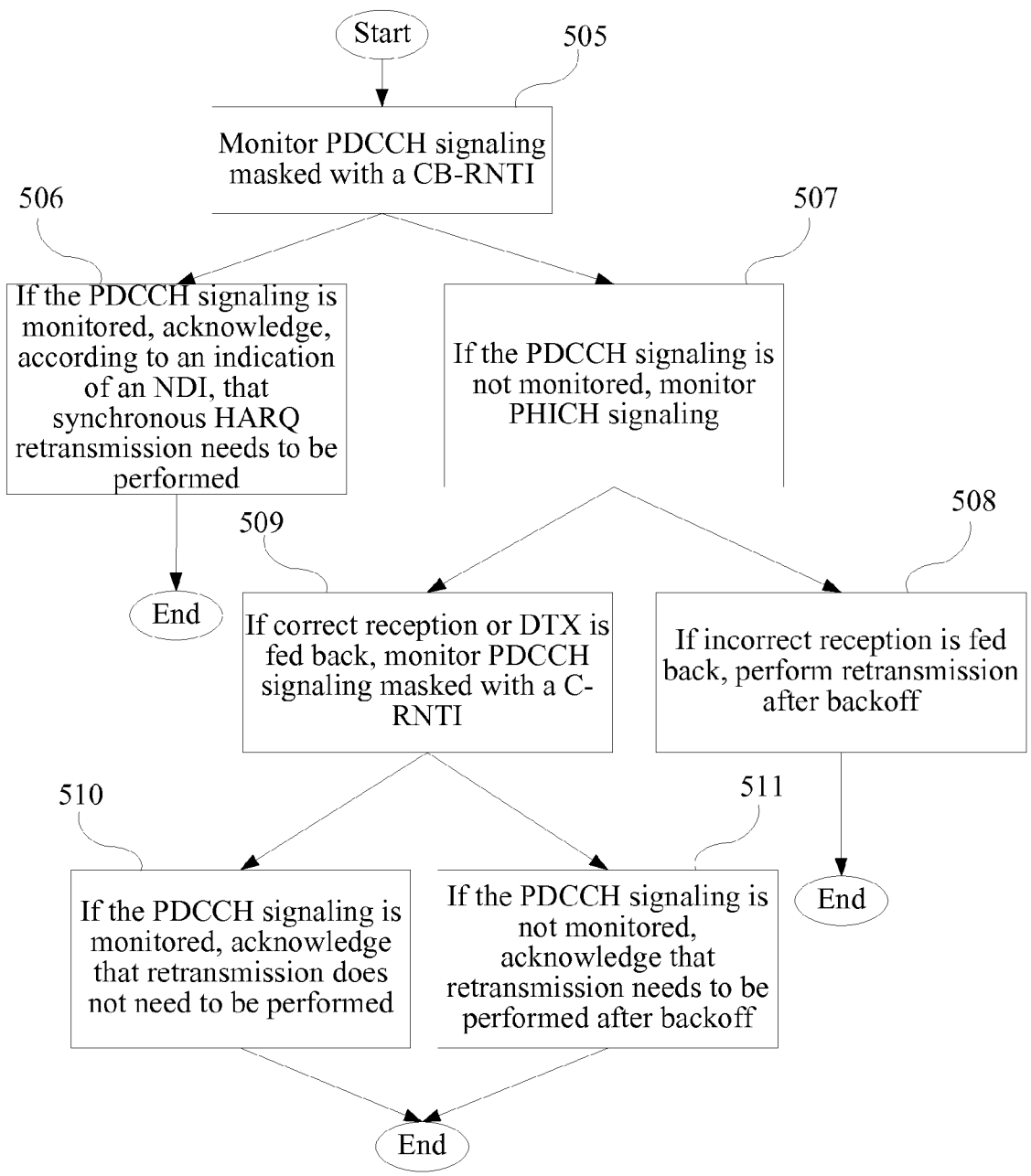
FIG. 5c is a schematic flowchart of another CB resource retransmission acknowledgement method according to an embodiment of the present invention.

The embodiment shown in FIG. 5b may be combined with the embodiments shown in FIG. 4a, FIG. 4b and FIG. 5a. An embodiment obtained through combining the embodiment shown in FIG. 5b with the embodiments shown in the foregoing accompanying drawings are described in detail below with reference to FIG. 5c.

Step 505: The sending device monitors, at a third time point, the PDCCH signaling masked with a CB-RNTI.

Step 506: If the PDCCH signaling masked with a CB-RNTI is monitored at the third time point, the sending device acknowledges, according to an indication of an NDI in the PDCCH signaling, that synchronous HARQ retransmission needs to be performed.

Step 507: If the PDCCH signaling masked with a CB-RNTI is not monitored at the third time point, the sending device monitors PHICH signaling at a second time point.

Step 508: If the sending device monitors the PHICH signaling at the second time point, and the PHICH signaling feeds back incorrect reception, the sending device acknowledges that retransmission needs to be performed after backoff for a period of time.

Step 509: If the sending device monitors the PHICH signaling at the second time point, and the PHICH signaling feeds back correct reception or DTX, the sending device monitors, at a first time point, PDCCH signaling masked with a C-RNTI.

Step 510: If the PDCCH signaling masked with a C-RNTI is monitored at a first time point, the sending device acknowledges that retransmission does not need to be performed.

Step 511: If the PDCCH signaling masked with a C-RNTI is not monitored at a first time point, the sending device acknowledges that retransmission needs to be performed after backoff for a period of time.

In this embodiment, for a relationship between the time points, reference may be made to the embodiments shown in FIG. 1a, FIG. 1b and FIG. 1c.

Through the method provided in this embodiment, the sending device may be enabled to accurately know whether the network side receives its uplink information correctly, so as to decide to start retransmission. Moreover, whether to perform synchronous HARQ retransmission or perform retransmission after backoff for a period of time is judged through the PDCCH signaling masked with a CB-RNTI and an NDI indication carried in it. Synchronous HARQ retransmission has the advantages that a retransmission rule is fixed and retransmission may be performed quickly, but is more suitable for a scenario having no conflict. Retransmission after backoff for a period of time has the advantages that it is suitable for a scenario having conflict, but a retransmission rule is not fixed, a long time is generally required before retransmission, and conflict may still possibly occur in retransmission.

Figure 6A:
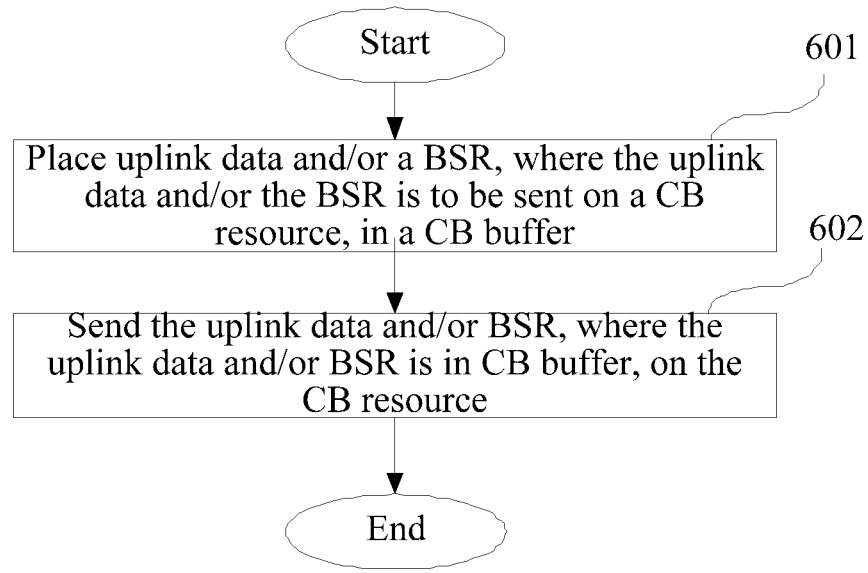
FIG. 6a is a schematic flowchart of a CB resource sending method according to an embodiment of the present invention.

As shown in FIG. 6a, an embodiment of the present invention provides a CB resource sending method. The method includes:

Step 601: A sending device places uplink data and/or a BSR, where the uplink data and/or the BSR is to be sent on a CB resource, in a CB buffer.

In this embodiment, the CB buffer is configured in the sending device, and is used to store uplink data and/or a BSR, where the uplink data and/or the BSR is to be sent on a CB resource. Further, the CB buffer is configured at an MAC layer.

In this embodiment, a step of configuring the CB buffer may be further included.

Step 602: The sending device sends the uplink data and/or the BSR, where the uplink data and/or the BSR is in CB buffer, on the CB resource.

In this embodiment, when the uplink data and/or the BSR is not received correctly, the uplink data and/or the BSR, where the uplink data and/or the BSR is stored in the CB buffer, may be retransmitted on a CB resource or a dedicated resource.

Through the CB resource sending method provided in this embodiment, the uplink data and/or the BSR, where the uplink data and/or the BSR is to be sent, may be placed in the CB buffer, thereby avoiding loss of MAC layer data when waiting for the CB resource or the dedicated resource, and meanwhile, avoiding data loss in retransmission or upper-layer data resending.

In this embodiment, the sending device may also maintain a retransmission counter. The retransmission counter may change each time when retransmission is performed. For example, the count is increased by 1 or decreased by 1 each time when retransmission is performed, till a maximum retransmission value or zero is reached. After the maximum retransmission value is reached, the retransmission counter is reset to zero; or after zero is reached, the retransmission counter is reset to the maximum value. In the following description, that the retransmission counter starts to count from zero, and the count is increased by 1 each time when retransmission is performed, till the maximum retransmission value is reached is taken as an example. For a design method of other counters (for example, a transmission times counter, of which a maximum value is equal to the maximum value of the retransmission counter plus one), reference may be made to the following description, and details are not repeatedly described here.

In this embodiment, after the maximum retransmission value is reached, the sending device may discard the data, that is, clear the data from the CB buffer.

In this embodiment, when the network device feeds back correct reception, the sending device does not perform retransmission, and may empty the CB buffer.

Further, in this embodiment, when the sending device prepares to retransmit the BSR in the CB buffer, if the BSR needs to be updated, an updated BSR is stored in the CB buffer and sent.

In this embodiment, when the sending device prepares to retransmit the uplink data in the CB buffer, the uplink data may be retrieved from the CB buffer for retransmission.

In this embodiment, when retransmission is performed, if a dedicated resource is available, the sending device performs synchronous hybrid automatic repeat request HARQ retransmission on the dedicated resource; if a CB resource is available, the sending device performs synchronous HARQ retransmission or retransmission after backoff on the CB resource.

In this embodiment, when the sending device performs retransmission on the CB resource, for example, an asynchronous retransmission manner, for instance, a CB transmission dedicated process, may be adopted, so as to reduce probability of conflict occurring in retransmission.

In this embodiment, when the sending device performs retransmission on the dedicated resource, for example, a synchronous retransmission manner, that is, a HARQ retransmission manner, may be adopted, so as to improve efficiency of retransmission.

In this embodiment, when the sending device performs retransmission on the dedicated resource, a counter of a HARQ process may start to count from 0, and may also start to count from a value of the retransmission counter.

Figure 6B:
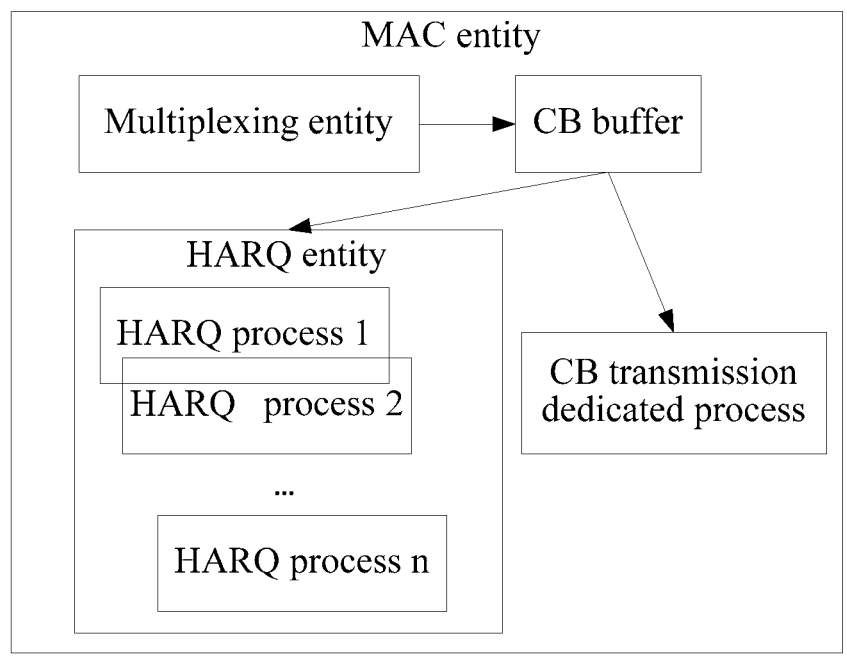
FIG. 6b is a schematic structural diagram of a protocol stack according to an embodiment of the present invention.

The method shown in this embodiment may be implemented through a protocol stack shown in FIG. 6b. The CB buffer may be an independent functional entity, and may also be a part of a CB transmission dedicated process.

Through the sending method provided in this embodiment, the uplink data or the BSR, where the uplink data and/or the BSR is to be sent on the CB resource, may be temporarily stored, so as to wait for the CB resource for sending, thereby avoiding data loss. Meanwhile, in retransmission, the data may be directly obtained from the CB buffer for sending, without waiting for upper-layer retransmission, thereby avoiding loss of retransmission data. Meanwhile, the BSR may also be updated before retransmission, so that the network side is enabled to obtain a latest buffer state, and schedule the dedicated resource more accurately. Moreover, in this embodiment, through the CB transmission dedicated process, it is ensured that asynchronous retransmission may be performed, which is more suitable for transmission on the CB resource, thereby avoiding a situation that plenty of conflict occur in retransmission. Further, in this embodiment, a solution from a CB buffer to a HARQ process is also provided, so that the data in the CB buffer may also be sent on the dedicated resource by adopting a synchronous retransmission manner.

Figure 7A:
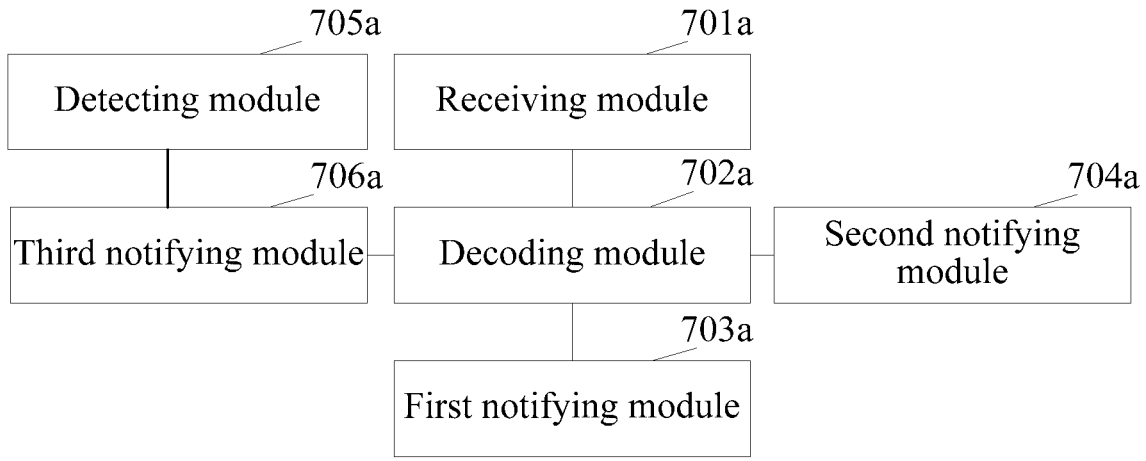
FIG. 7a is a schematic structural diagram of a network device according to an embodiment of the present invention.

As shown in FIG. 7a, an embodiment of the present invention provides a network device. The network device may be, for example, a base station, or may also be a relay station. The network device includes:

a receiving module 701a, configured to receive uplink information that is sent by a sending device on a CB resource;

a decoding module 702a, configured to decode the uplink information received by the receiving module 701a; and a first notifying module 703a, configured to, when the decoding module 702a decodes the uplink information, feed back, through a first PDCCH, correct reception to the sending device, where the first PDCCH is masked with an identifier of the sending device.

Further, in this embodiment, the network device may also include:

a second notifying module 704a, configured to, when the decoding module 702a does not decode the uplink information, feed back, through a PHICH, incorrect reception.

Further, in this embodiment, the network device may also include:

a detecting module 705a, configured to detect conflict on a CB resource block that bears the uplink information; and a third notifying module 706a, configured to, when the decoding module 702a does not decode the uplink information and the detecting module 705a detects no conflict, send a retransmission indication through a second PDCCH, where the second PDCCH is masked with a CB-RNTI.

In this embodiment, a time sequence of execution of one or multiple of the first notifying module 703a, the second notifying module 704a and the third notifying module 706a may also be limited. For limitations on time conditions, reference may be made to the corresponding content in the foregoing method embodiments.

Through the network device provided in this embodiment, a receiving status of uplink information of each sending device may be accurately fed back to different sending device, so that the sending device may enabled to accurately and quickly perform retransmission or new transmission.

The network device provided in this embodiment may be, for example, used to execute the method embodiments executed by the foregoing network device.

Figure 7B:
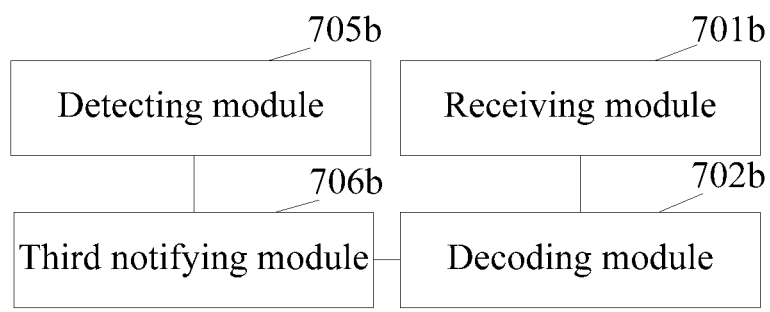
FIG. 7b is a schematic structural diagram of another network device according to an embodiment of the present invention.

As shown in FIG. 7b, an embodiment of the present invention further provides another network device, where the network device includes:

a receiving module 701b, configured to receive uplink information that is sent by a sending device on a CB resource;

a decoding module 702b, configured to decode the uplink information received by the receiving module 701b;

a detecting module 705b, configured to detect conflict on a CB resource block that bears the uplink information; and a third notifying module 706b, configured to, when the decoding module 702b does not decode the uplink information and the detecting module 705b detects no conflict, send a retransmission indication through a PDCCH, where the PDCCH is masked with a CB-RNTI.

Through the network device provided in this embodiment, a receiving status of uplink information of each sending device may be accurately fed back to different sending devices, so that the sending device may be enabled to accurately and quickly perform retransmission or new transmission.

Figure 7C:
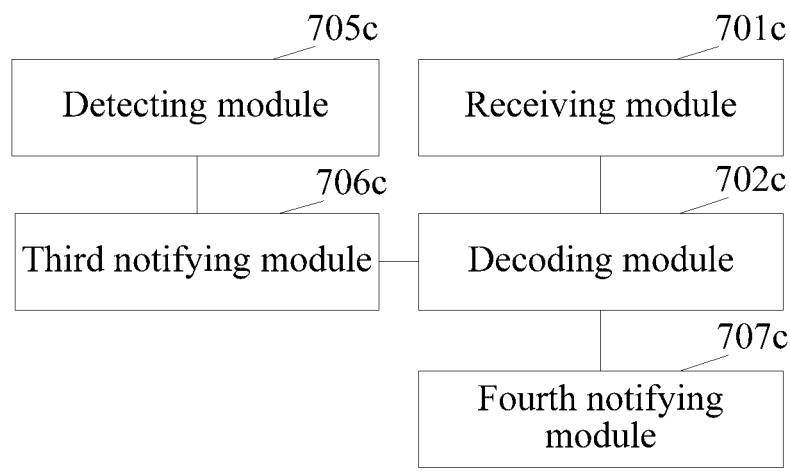
FIG. 7c is a schematic structural diagram of another network device according to an embodiment of the present invention.

As shown in FIG. 7c, an embodiment of the present invention further provides another network device, where the network device includes:

a receiving module 701c, configured to receive uplink information that is sent by a sending device on a CB resource;

a detecting module 705c, configured to detect conflict on a CB resource block that bears the uplink information;

a decoding module 702c, configured to decode the uplink information received by the receiving module 701c;

a fourth notifying module 707c, configured to, when the decoding module 702c decodes the uplink information, feed back, through an MAC CE, correct reception to the sending device; and a third notifying module 706c, configured to, when the decoding module 702c does not decode the uplink information and the detecting module 705c detects no conflict, send a retransmission indication through a PDCCH, where the PDCCH is masked with a CB-RNTI.

Through the network device provided in this embodiment, a receiving status of uplink information of each sending device may be accurately fed back to different sending devices, so that the sending device may be enabled to accurately and quickly perform retransmission or new transmission.

Figure 7D:
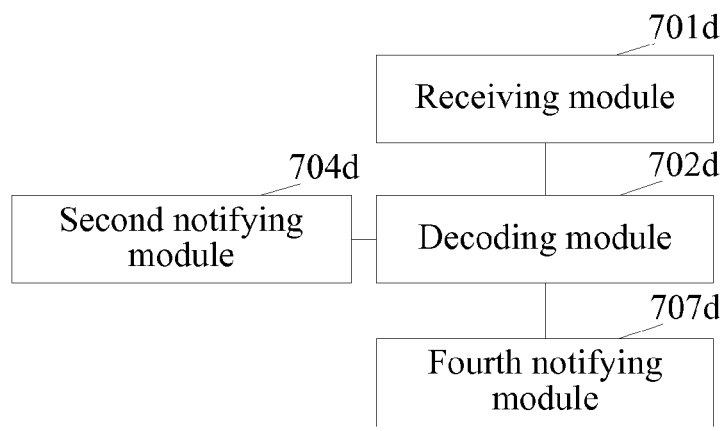
FIG. 7d is a schematic structural diagram of another network device according to an embodiment of the present invention.

As shown in FIG. 7d, an embodiment of the present invention provides another network device. The network device includes:

a receiving module 701d, configured to receive uplink information that is sent by a sending device on a contention based CB resource;

a decoding module 702d, configured to decode the uplink information received by the receiving module 701d;

a fourth notifying module 707d, configured to, when the decoding module 702d decodes the uplink information, feed back, through an MAC CE, correct reception to the sending device; and a second notifying module 704d, configured to, when the decoding module 702d does not decode the uplink information, feed back, through a PHICH, incorrect reception.

Through the network device provided in this embodiment, a receiving status of uplink information of each sending device may be accurately fed back to different sending devices, so that the sending device may be enabled to accurately and quickly perform retransmission or new transmission.

The embodiments shown in FIG. 7a to FIG. 7d may be combined, and more embodiments may be obtained after combination, for example, a network device including a receiving module 701, a decoding module 702, a first notifying module 703, a second notifying module 704, a detecting module 705, a third notifying module 706 and a fourth notifying module 707.

The embodiments shown in FIG. 7a to FIG. 7d may be used to execute the method embodiments implemented by the network device.

Figure 8A:
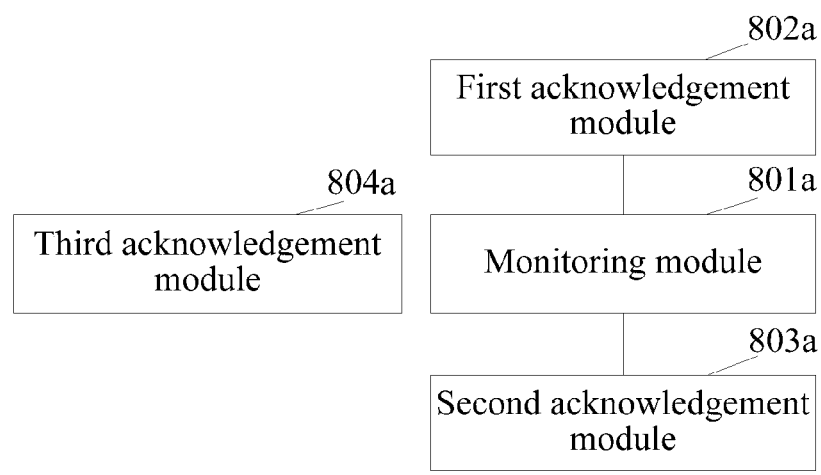
FIG. 8a is a schematic structural diagram of a sending device according to an embodiment of the present invention.

As shown in FIG. 8a, an embodiment of the present invention provides a sending device. The sending device may be, for example, a UE, and may also be a relay station. The sending device includes:

a monitoring module 801a, configured to monitor physical downlink control channel PDCCH signaling, where the PDCCH signaling is masked with an identifier sending device; and a first acknowledgement module 802a, configured to, when the monitoring module 801a monitors the PDCCH signaling, acknowledge that retransmission does not need to be performed.

Further, the monitoring module 801a may also be configured to monitor PDCCH signaling masked with a CB-RNTI. Moreover, the sending device may also include: a second acknowledgement module 803a, configured to, when the monitoring module 801a monitors the PDCCH signaling masked with a CB-RNTI, acknowledge that synchronous HARQ retransmission needs to be performed.

Further, the monitoring module 801a may also be configured to monitor PHICH signaling. Moreover, the sending device may also include: a third acknowledgement module 804a, configured to, when the monitoring module 801a monitors the PHICH signaling, acknowledge that retransmission needs to be performed.

In this embodiment, the third acknowledgement module 804a may also be configured to, when the monitoring module 801a monitors the PHICH signaling and the signaling is used to feed back incorrect reception, acknowledge that retransmission needs to be performed. The retransmission may be, for example, backoff retransmission.

In specific implementation, the third acknowledgement module 804a may be configured to acknowledge that retransmission needs to be performed after backoff, and the second acknowledgement module is configured to acknowledge that synchronous HARQ retransmission needs to be performed. Moreover, when the monitoring module 801a monitors the PHICH signaling and also monitors the PDCCH signaling masked with a CB-RNTI, synchronous HARQ retransmission is still performed.

Through the sending device provided in the embodiments of the present invention, a status of receiving, by the network side, the uplink information that is transmitted on the CB resource may be known, so that whether retransmission needs to be performed may be judged more accurately.

Figure 8B:
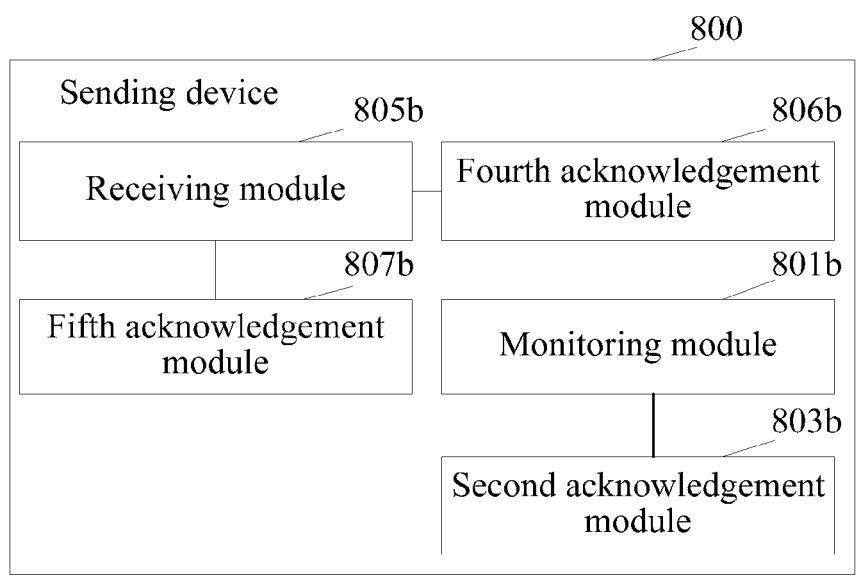
FIG. 8b is a schematic structural diagram of another sending device according to an embodiment of the present invention.

As shown in FIG. 8b, an embodiment of the present invention provides a sending device 800. The sending device 800 includes: a receiving module 805b, configured to receive an MAC CE, where the MAC CE is used to feed back that uplink information sent by the sending device on a CB resource is received correctly by a network side; a monitoring module 801b, configured to monitor PDCCH signaling, where the PDCCH signaling is masked with a CB-RNTI; and one or any combination of the following modules:

a second acknowledgement module 803b, configured to, when the monitoring module 801b monitors the PDCCH signaling, according to a retransmission indication carried in the PDCCH signaling, acknowledge that synchronous HARQ retransmission needs to be performed;

a fourth acknowledgement module 806b, configured to, when the receiving module 805b correctly receives the MAC CE, acknowledge that retransmission does not need to be performed; and a fifth acknowledgement module 807b, configured to, when the receiving module 805b does not correctly receive the MAC CE, acknowledge that retransmission needs to be performed after backoff.

Through the sending device provided in the embodiments of the present invention, a status of receiving, by the network side, the uplink information that is transmitted on the CB resource may be known, so that whether retransmission needs to be performed may be judged more accurately.

Figure 8C:
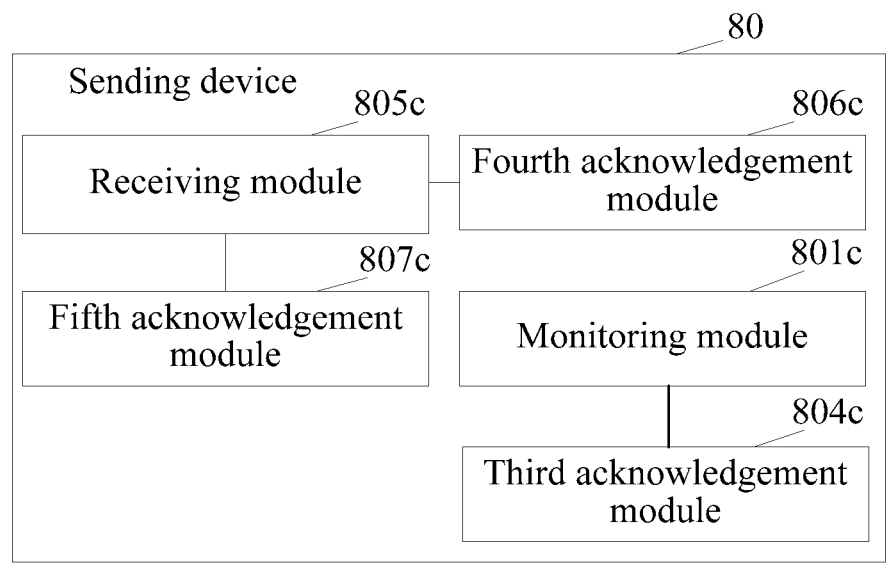
FIG. 8c is a schematic structural diagram of another sending device according to an embodiment of the present invention.

As shown in FIG. 8c, an embodiment of the present invention provides another sending device 80. The sending device 80 includes:

a receiving module 805c, configured to receive an MAC CE, where the MAC CE is used to feed back that uplink information sent by the sending device on a CB resource is received correctly by a network side; a monitoring module 801c, configured to monitor PHICH signaling, where the PDCCH signaling is masked with an identifier of the sending device; and one or any combination of the following modules:

a third acknowledgement module 804c, configured to, when the monitoring module 801c monitors the PHICH signaling, acknowledge that retransmission needs to be performed;

a fourth acknowledgement module 806c, configured to, when the receiving module 805c correctly receives the MAC CE, acknowledge that retransmission does not need to be performed; and a fifth acknowledgement module 807c, configured to, when the receiving module 805c does not correctly receive the MAC CE, acknowledge that retransmission needs to be performed after backoff.

Figure 9:
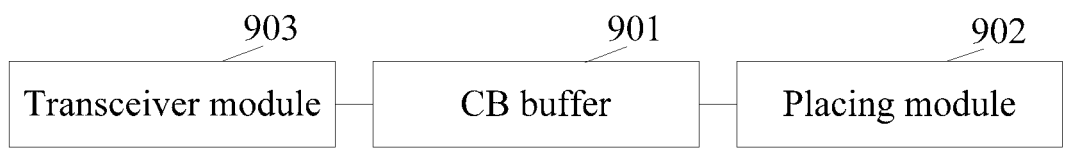
FIG. 9 is a schematic structural diagram of another sending device according to an embodiment of the present invention.

As shown in FIG. 9, an embodiment of the present invention provides another sending device. The sending device includes: a CB buffer 901, configured to store uplink data and/or a buffer status report BSR; a placing module 902, configured to place uplink data and/or a BSR, where the uplink data and/or the BSR is to be sent on a CB resource, in the CB buffer 901; and a transceiver module 903, configured to send the uplink data and/or the BSR, where the uplink data and/or the BSR is in the CB buffer 901, on the CB resource.

In this embodiment, the transceiver module 903 is further configured to receive feedback information of a network side, where the feedback information is used to indicate that the uplink data and/or the BSR is received correctly or received incorrectly; and when feedback about incorrectly receiving is received, retrieve the uplink data and/or the BSR from the CB buffer 901, and perform retransmission through a dedicated resource or a CB resource.

The CB buffer 901 is further configured to, when the transceiver module 903 receives feedback about correctly receiving, empty the CB buffer 901.

In this embodiment, the transceiver module 903 is specifically configured to, if a dedicated resource is available, perform synchronous hybrid automatic repeat request HARQ retransmission on the dedicated resource; if a CB resource is available, perform synchronous HARQ retransmission or retransmission after backoff on the CB resource.

In this embodiment, the sending device may further include, for example, a retransmission counter. For specific setting of the retransmission counter, reference may be made to the embodiment shown in FIG. 6.

In this embodiment, the sending device adopts, for example, a protocol stack shown in FIG. 6*b*.

In this embodiment, the transceiver module 903 may adopt a CB transmission dedicated process when performing backoff retransmission on the CB resource.

The sending device provided in this embodiment may, for example, execute the method provided in the embodiment shown in FIG. 6*a*.

This embodiment may be, for example, combined with the embodiments shown in FIG. 8*a*, FIG. 8*b*, and FIG. 8*c*.

Through the sending device provided in this embodiment, data may be successfully sent on the CB resource, and data may be directly obtained from the CB buffer in retransmission, thereby a problem of data loss or upper-layer data retransmission does not occur.

Through the sending device provided in the embodiments of the present invention, a status of receiving, by the network side, the uplink information that is transmitted on the CB resource may be known, so that whether retransmission needs to be performed may be judged more accurately.

Finally, it should be noted that, persons of ordinary skill in the art can understand that all or part of the steps in each method according to the embodiments of the present invention may be implemented by a program instructing relevant hardware, and the program may be stored in a computer readable storage medium. When the program is run, steps of each method according to the embodiments of the present invention are performed. The storage medium may be a magnetic disk, an optical disk, a read-only memory (ROM), a random access memory (RAM), and so on.

The functional units in the embodiments of the present invention may be integrated in a processing module, or may also exist as separate physical units; or, two or more of the units may be integrated in one module. The integrated modules may be implemented in a form of hardware or be implemented in a form of software functional modules. If implemented in the form of software functional modules and sold or used as an independent product, the integrated modules may also be stored in a computer readable storage medium. The storage medium may be a read-only memory, a magnetic disk, an optical disk or the like.

The above specific embodiments are not intended to limit the present invention, and for persons with ordinary skill in the art, any modification, equivalent replacement, or improvement made without departing from the principle of the present invention should fall within the protection scope of the present invention.

What is claimed is:

1. An information feedback method by a network device configured to receive uplink information from a sending device, the method comprising:
   receiving, by the network device, uplink information that is sent by a sending device on a contention based (CB) resource; and
   performing a conditional feedback operation by:
   feeding back, by the network device to the sending device, correct reception of the uplink information through a first physical downlink control channel (PDCCH) masked with an identifier of the sending device or through a media access control layer control element (MAC CE) when the uplink information is successfully decoded;
   feeding back, by the network device to the sending device, incorrect reception of the uplink information, when the uplink information is not successfully decoded and no conflict is detected on the CB resource that bears the uplink information, through a second PDCCH masked with a contention radio network temporary identifier (CB-RNTI), wherein the feeding back incorrect reception of the uplink information constitutes an indication, to the sending device, to retransmit the uplink information to the network device through hybrid automatic repeat request (HARQ) retransmission; and
   feeding back, by the network device to the sending device, incorrect reception of the uplink information, when the uplink information is not successfully decoded, through a physical hybrid automatic repeat request indicator channel (PHICH), wherein the feeding back incorrect reception of the uplink information constitutes an indication, to the sending device, to retransmit the uplink information to the network device after waiting a backoff period of time.

2. The method according to claim 1, wherein the identifier of the sending device is a cell radio network temporary identifier (C-RNTI).

3. An information transmission method by a sending device configured to send uplink information to a network device the method comprising:
   sending, by the sending device, uplink information on a contention based (CB) resource to a network device;
   monitoring, by the sending device, for feedback of the uplink information from the network device; and
   performing a conditional retransmission of the uplink information, in accordance with the monitoring, by:
   determining by the sending device, that the uplink information does not need to be retransmitted, when the sending device obtains, through monitoring, correct reception of the uplink information on a first physical downlink control channel (PDCCH) masked with an identifier of the sending device or in a media access control layer control element (MAC CE);
   determining, by the sending device, to retransmit the uplink information through hybrid automatic repeat request (HARQ) retransmission, when the sending device obtains, through monitoring, incorrect reception of the uplink information on a second PDCCH masked with a contention radio network temporary identifier (CB-RNTI); and
   determining, by the sending device, to retransmit the uplink information after waiting a backoff period of time, when the sending device obtains, through monitoring, incorrect reception of the uplink information on a physical hybrid automatic repeat request indicator channel (PHICH).

4. The method according to claim 3, wherein the second PDCCH comprises a retransmission indication.

5. A network device, comprising:
a processing hardware platform; and
a non-transitory computer-readable storage medium including computer-executable instructions for configuring the processing hardware platform to perform, when executing the computer-executable instructions, a method including:
receiving uplink information that is sent by a sending device on a contention based (CB) resource;
decoding the uplink information received by; and
performing a conditional feedback operation by:
feeding back, to the sending device, correct reception of the uplink information through a first physical downlink control channel (PDCCH) masked with an identifier of the sending device or through a media access control layer control element (MAC CE), when the uplink information is successfully decoded;
feeding back, by the network device to the sending device, incorrect reception of the uplink information, when the uplink information is not successfully decoded and no conflict is detected on the CB resource that bears the uplink information, through a second PDCCH masked with a contention radio network temporary identifier (CB-RNTI), wherein the feeding back incorrect reception of the uplink information constitutes an indication, to the sending device, to retransmit the uplink information to the network device through hybrid automatic repeat request (HARQ) retransmission; and
feeding back, by the network device to the sending device, incorrect reception of the uplink information, when the uplink information is not successfully decoded, through a physical hybrid automatic repeat request indicator channel (PHICH), wherein the feeding back incorrect reception of the uplink information constitutes an indication, to the sending device, to retransmit the uplink information to the network device after waiting a backoff period of time.

6. The network device according to claim 5,
wherein the second PDCCH comprises a retransmission indication.

7. The network device according to claim 5, wherein the identifier of the sending device is a cell radio network temporary identifier (C-RNTI).

8. The network device according to claim 5, wherein a redundant state or a specific value in an existing format of the PDCCH is used to indicate the correct reception of the uplink information.

9. The network device according to claim 5, wherein a redundant state in an NDI field, a modulation and coding scheme (MCS) field or a HARQ field is used to indicate the correct reception of the uplink information, and wherein the NDI field, the MCS field or the HARQ field is in an existing format.

10. A sending device, comprising:
a contention based (CB) buffer, configured to store uplink information;
a transceiver, configured for sending the uplink information on a CB resource to a network device;
a processing hardware platform; and
a non-transitory computer-readable storage medium including computer-executable instructions for configuring the processing hardware platform to perform, when executing the computer-executable instructions, a method including:
monitoring for feedback of the uplink information from the network device; and
performing a conditional retransmission of the uplink information, in accordance with the monitoring, by:
determining that the uplink information does not need to be retransmitted, when obtaining, through monitoring, correct reception of the uplink information on a first physical downlink control channel (PDCCH) masked with an identifier of the sending device or in a media access control layer control element (MAC CE);
determining to retransmit the uplink information through hybrid automatic repeat request (HARQ) retransmission, when obtaining, through monitoring, incorrect reception of the uplink information on a second PDCCH masked with a contention radio network temporary identifier (CB-RNTI); and
determining to retransmit the uplink information after waiting a backoff period of time, when obtaining, through monitoring, incorrect reception of the uplink information on a physical hybrid automatic repeat request indicator channel (PHICH).

11. The sending device according to claim 10,
wherein the second PDCCH comprises a retransmission indication.

12. The sending device according to claim 10, wherein the identifier of the sending device is a cell radio network temporary identifier (C-RNTI).

13. The sending device according to claim 10, wherein a redundant state or a specific value in an existing format of the PDCCH is used to indicate the correct reception of the uplink information.

14. The sending device according to claim 13, wherein a redundant state in an NDI field, a modulation and coding scheme (MCS) field or a HARQ field is used to indicate the correct reception of the uplink information, the NDI field, the MCS field or the HARQ field is in an existing format.

15. The network device according to claim 5, wherein a preset time for feeding back the incorrect reception is earlier than a preset time for feeding back the correct reception.

16. The method according to claim 3, further comprising:
performing, by the sending device when a dedicated resource is available, synchronous HARQ retransmission on the dedicated resource for the uplink information; or
performing, by the sending device when a CB resource is available, synchronous HARQ retransmission or retransmission after backoff on the CB resource.

17. The method according to claim 16, wherein when the sending device performs retransmission on the CB resource, a CB transmission dedicated process is adopted.

18. The method according to claim 10, the method further comprising:
performing, by the sending device when a dedicated resource is available, synchronous HARQ retransmission on the dedicated resource for the uplink information; or
performing, by the sending device when a CB resource is available, synchronous HARQ retransmission or retransmission after backoff on the CB resource.

19. The method according to claim 18, wherein when retransmission is performed on the CB resource, a CB transmission dedicated process is adopted.

* * * * *